(12) United States Patent
Nagashima

(10) Patent No.: US 7,749,411 B2
(45) Date of Patent: Jul. 6, 2010

(54) OPTICAL FILM AND PRODUCTION METHOD OF THE SAME

(75) Inventor: Katsusuke Nagashima, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 1124 days.

(21) Appl. No.: 11/286,201

(22) Filed: Nov. 23, 2005

(65) Prior Publication Data

US 2006/0115610 A1 Jun. 1, 2006

(30) Foreign Application Priority Data

Dec. 1, 2004 (JP) .............................. 2004-347995

(51) Int. Cl.
B29D 11/00 (2006.01)
B29D 55/12 (2006.01)

(52) U.S. Cl. .................. 264/1.6; 264/2.7; 264/290.2; 428/1.3

(58) Field of Classification Search .............. 264/1.6, 264/2.7, 290.2; 428/1.3
See application file for complete search history.

(56) References Cited

U.S. PATENT DOCUMENTS

| 2,336,310 A | 12/1943 | Spence et al. |
| 2,367,603 A | 1/1945 | Nystrom |
| 2,492,977 A | 1/1950 | Fordyce et al. |
| 2,492,978 A | 1/1950 | Fordyce et al. |
| 2,607,704 A | 8/1952 | Fordyce et al. |
| 2,739,069 A | 3/1956 | Fordyce et al. |
| 2,739,070 A | 3/1956 | Fordyce et al. |
| 3,375,313 A * | 3/1968 | Prietzschk et al. ....... 264/290.2 |
| 3,890,421 A * | 6/1975 | Habozit .................. 264/290.2 |
| 6,190,153 B1 * | 2/2001 | Tsuzukiyama et al. ...... 425/135 |
| 6,398,993 B1 * | 6/2002 | Yushio et al. ............. 264/40.7 |
| 6,746,633 B2 * | 6/2004 | Sakamaki et al. .......... 264/1.34 |

FOREIGN PATENT DOCUMENTS

| JP | 50-83482 | | 7/1975 |
| JP | 02-113920 | A | 4/1990 |
| JP | 03-124426 | A | 5/1991 |
| JP | 04-164626 | A | 6/1992 |
| JP | 2000009912 | A * | 1/2000 |

* cited by examiner

Primary Examiner—Philip C Tucker
Assistant Examiner—Alison Hindenlang
(74) Attorney, Agent, or Firm—Frishauf, Holtz, Goodman & Chick, P.C.

(57) ABSTRACT

A method of producing an optical film comprising the step of: stretching a continuous resinous film by apply tension to a transverse direction of the resinous film while conveying the resinous film, wherein the stretching is carried out with a stretching apparatus comprising right and left edge holding devices which hold right and left edges of the resinous film; and, the right and left edge holding devices of the stretching apparatus each independently controls right and left edge holding distances of the resinous film so that a slow axis of the resinous film is substantially perpendicular or substantially parallel to a film conveying direction, provided that the edge holding distance is defined as a distance between an initiation position and a cessation position of holding of the edge of the resinous film.

8 Claims, 5 Drawing Sheets

OPTICAL FILM AND PRODUCTION METHOD OF THE SAME

This application is based on Japanese Patent Application No. 2004-347995 filed on Dec. 1, 2004 in Japanese Patent Office, the entire content of which is hereby incorporated by reference.

TECHNICAL FIELD

The present invention relates to an optical film, provided with a retardation function and a viewing angle enlarging function, which is employable in a liquid crystal display device, and the production method thereof.

BACKGROUND

Liquid crystal display devices are commonly constituted of providing a polarizing plate on both sides of a liquid crystal cell. The polarizing plate transmits light of a plane of polarization in a fixed direction. Consequently, in liquid crystal display units, the polarizing plate plays a critical role in which variation of orientation of liquid crystals due to an electric field is visualized. Accordingly, the performance of liquid crystal display devices significantly varies depending on the performance of polarizing plate.

Production methods of optical films are divided mainly into a solution casting film forming method and a melt casting film forming method. The former is a method in which polymers are dissolving in solvents, the resulting solution is cast, the solvents are evaporated, and if desired, stretching is performed to prepare film. This method has been widely employed, since it results in excellent uniformity of film thickness. However, it has also resulted in problems such as an increase in size of facilities. The latter is a method in which polymers are heat-melted, cast onto a support, cooled, and solidified, and if desired, stretched to form film. Since it is not necessary to dry solvents, one advantage is that it is possible to downsize facilities. However, problems of uniformity of film thickness result.

In recent years, it is common to employ retardation correcting film in liquid crystal display units. Along with larger image screens and higher definition, quality demanded for retardation films becomes more sever. Specifically, in the retardation film exhibiting larger in-plane retardation, the demand in the slow axis (being the orientation axis) direction (being an orientation angle) is more severe, and it is desired that the accuracy is commonly at most angle of 1° over the entire area within the film but is preferably in the range of about ±0.3 to about 0.5°.

Commonly employed as such a retardation film is one which is prepared by uniaxially stretching a polycarbonate based resinous film, exhibiting a relatively large intrinsic double refractive index, in the longitudinal direction (being the film running direction during production). However it has not been possible to obtain a positive wavelength dispersion characteristic by employing only a single polycarbonate based retardation film.

Further, the slow axis of the above retardation film is in the longitudinal direction, which equals the stretching direction. In cases in which the retardation film for VA mode liquid crystals is adhered to a polarizing film, it is necessary that the slow axis is directed toward the transverse direction (being perpendicular in the film plane with respect to the uniaxial stretching direction of a polarizing film). However, it is not possible to allow a retardation film exhibiting the slow axis in the longitudinal direction to adhere to the polarizing film in the form of a long roll, and it is necessary to adhere to each other matching the direction while cutting it into sheets. Consequently, problems have occurred, whereby productivity is markedly degraded.

On the other hand, in view of enhancement of productivity, preferred is a film whose orientation angle is in the transverse direction (being the TD direction) of a long film, because it is possible to perform production in the roll form during the polarizing plate adhesion process. The above film whose orientation angle is in the TD direction is frequently produced employing resins such as polycarbonates or cellulose ester based resins, which are subjected to molecular orientation (exhibiting positive birefringence) in the stretching direction while employing a lateral stretching apparatus.

Further, it is required that the slow direction of retardation film for IPS mode liquid crystals matches the longitudinal direction of a polarizing film. In this case, when stretching is performed in the above TD direction, it is not possible to achieve adhesion in the form of a roll, whereby productivity is degraded. Consequently, film is produced by stretching in the MD direction or in the TD direction employing materials such as polystyrene based resins or acrylic resins which are subjected to molecular orientation (exhibiting negative birefringence) perpendicular to the stretching direction. The MD direction designates a film conveying direction.

In the lateral stretching process employing a tenter, film is heated to a temperature optimal for stretching and stretched in the TD direction. It is well known that bowing phenomena occur in which a straight line (being a stretching line) drawn in the TD direction of the film prior to stretching is curved in the form of an arc after stretching.

When such bowing phenomena occur, problems result in which the orientation axis of the retardation film is aligned in the tangential direction of the extension of the arc, whereby the resulting orientation angle is not uniformly directed in the TD direction. Since the bowing phenomena vary depending on stretching conditions, various technologies to minimize the bowing phenomena have been disclosed.

Incidentally, in cases in which the bowing phenomena are eliminated by working out stretching conditions (wherein the stretching line is in a straight line), the film in the tenter becomes is softened via heating, whereby the orientation angle results in distribution in the transverse direction due to a mechanical asymmetric property of the tenter. Further, when temperature distribution results across the width in the tenter, the softness of the film differs across the width to result in non-uniform stretching, whereby the orientation angle results in distribution.

Further, other than the tenter stretching apparatus, are many other factors which result in non-uniform orientation angle in the transverse direction.

During production of optical film, close attention is paid so that non-uniformity of the film thickness in the transverse direction is minimized through the conveying line, the heating/drying equipment, and casting. However, right and left mechanical uniformity in the production line is degraded over a period of time due to thermal distortion repeatedly applied to the production facilities and abrasion of sliding sections, whereby the resulting orientation angle varies over an elapse of time.

Further, in cases in which an optical film is produced in such a manner that a film prepared employing a solution casting film forming method is subjected to in-line stretching the conveyed film is softened due to incorporation of solvents and is greatly influenced by the right and left non-uniformity of the conveying line, whereby the orientation angle of the film tends to result in distribution in the transverse direction.

The in-line stretching designates a method in which the film formed is stretched continuously without interruption.

Still further, film which has been peeled from the support results in optical characteristic distribution in the transverse direction due to non-uniform thickness and non-uniform drying in the transverse direction. Such distribution in the transverse direction is pronounced when the casting rate is increased to enhance productivity.

During production of a high precision optical film, especially a retardation film, it is essential that the distribution in the transverse direction of the above orientation angle is maintained within the desired accuracy range.

In the production method of film employing a transverse stretching apparatus, a method is not substantially available which precisely controls the orientation angle in the longitudinal or transverse direction.

Conventionally, a film at an orientation angle of 0°/90° has been produced by arranging the conveying line and the stretching apparatus to be as uniform as possible on the right and the left with respect to the machine center. However, mechanical accuracy tends to vary over an elapse of time, whereby precise control is required.

In the production method of optical films employing a lateral stretching apparatus, disclosed as a method for controlling the orientation angle are many technologies which result in an oblique orientation angle with respect to the MD direction of the film. For example, in Patent Documents 1 and 2 below, film production methods are proposed which employ lateral direction film stretching apparatuses in which the running rate and distance of the right and left clips differ.

Patent Document 1 and the method described therein disclose a technique in which by declining the orientation axis by 45° in the longitudinal direction of the film, lateral and longitudinal film strength is allowed to be uniform in the lateral direction/longitudinal direction.

Further, similar optical film production methods are disclosed in Patent Documents 3-5 below. These also disclose techniques to decline the orientation axis by 10-80° with respect to the longitudinal direction.

(Patent Document 1) Japanese Patent Publication for Public Inspection (hereinafter referred to as JP-A). No. 50-83482
(Patent Document 2) JP-A No. 2-113920
(Patent Document 3) JP-A No. 3-124426
(Patent Document 5) JP-A No. 4-164626

SUMMARY

However, all the methods described in the above Patent Documents relate to techniques to lean the orientation axis and result in problems, whereby it is not possible to achieve precise control within the required value of ±1°, the orientation angle of an optical film having the orientation angle substantially perpendicular or parallel to the longitudinal direction of the film (the film conveying direction).

An object of the present invention is to provide an optical film exhibiting excellent retardation compensating performance and a viewing angle enlarging function by precisely controlling the required value within ±1° of the orientation angle of the optical film having an orientation axis substantially perpendicular or parallel to the longitudinal direction of the film, while solving the above conventional problems, and a production method of the same.

In view of the foregoing, the inventors of the present invention conducted diligent investigation, resulting in the following discovery to achieve the present invention. In an optical film stretching line, in a tenter stretching apparatus, the film holding distance (or called as the edge holding distance) is allowed to different between the right and left edges by independently control the distance of the portion holding both edges of a resinous film. As a result, a shear force, a force which twists the resinous film is generated in the tenter, so that it is possible to correct the deviation of the orientation angle caused by mechanical non-uniformity between the right and left in the tenter and non-uniformity of conveyance and drying facilities, other than in the tenter. As a result, it is possible to produce an optical film which exhibits a uniform orientation angle in the transverse direction (being the TD direction) over approximately entire portion of the film, excellent retardation compensating performance, and a viewing angle enlarging function.

In order to achieve the above object, the invention of the production method of the optical film described in Embodiment 1 of the present invention is characterized as follows. In a method to produce an optical film employing a stretching apparatus in which both right and left edges of a continuous resinous film are held while transverse tension is applied and the above resinous film is stretched during its conveyance. Stretching is performed so that the optical slow axis is substantially perpendicular (at an average value of 90°±1.5°), or substantially parallel (at an average value within 0°±1.5°) to the film conveying direction, by independently controlling the film holding distance (the distance from the start of holding to the cessation of holding) of both edges, employing a device which holds both edges.

Another aspect of the invention described in Embodiment 2 is characterized in that in the production method of the optical film described in Embodiment 1 above, right and left holding devices of the stretching apparatus allows difference in the right and left film holding distance by allowing the right and left holding initiation positions (the clip closer arranging positions) to differ.

Further, another aspect of the invention described in Embodiment 3 is characterized in that in the production method of the optical film described in Embodiment 1 above, the right and left holding devices of the stretching apparatus allow the right and left film holding distance to differ by allowing the right and left holding termination positions (the clip opener arranging positions) to differ.

Another aspect of the invention described in Embodiment 4 is characterized in that in the production method of the optical film described in Embodiment 1 above, the right and left film holding distances are independently made to differ by independently changing the right and left distances of the looped track rail to move the connected holding devices which hold both right and left edges of the continuous resinous film, and result in tension to the film in the transverse direction.

Further, as a means to allow the right and left rail distances to differ, other than that the distance is allowed to differ in the plane (the common horizontal plane) having clips (example of holding devices), inclining in the perpendicular direction (the vertical direction) to the clip running plane may be performed. Further, in the tenter apparatus, tension is applied to the connected clip chain and the right and left film holding distances are allowed to differ by making the right and left tensions to differ.

Another aspect of the invention of the production method of the optical film described in Embodiment 5 of the present invention is characterized in that in the method for producing an optical film employing a stretching apparatus in which both right and left edges of a continuous resinous film are held while transverse tension is applied and the above resinous film is stretched during its conveyance, stretching is performed so that the optical slow axis is substantially perpendicular (at an average value of 90°±1.5°) or substantially parallel (at an average value of 0°±1.5°) to the film conveying direction, by independently controlling the conveyance speed of right and left holding devices of the above stretching apparatus.

Herein, employed as a means to independently achieve the speed control of the right and left holding devices of the stretching apparatus is, for example, independent right and left driving motors. Incidentally, the right and left holding devices of the stretching apparatus are commonly controlled at the same speed, employing the same driving motor.

As noted above, not only by allowing the right and left holding distances of the resinous film to differ but also by allowing the right and left clip speeds to differ, a force which twists the resinous film is generated whereby any deviation of the orientation angle is corrected. Further, in order to achieve intended speed control, other than the above, employed may be a means such as a pantagraph and a spindle commonly employed as a biaxial stretching apparatus, or a linear motor.

Further, one of the embodiments of the present invention is characterized in that in the production method of the optical film described in any one of Embodiments 1-5 above, the orientation angle of the resinous film prior to winding is measured on-line, and based on the results, right and left film holding distances are independently controlled employing the right and left holding devices of the stretching apparatus, or the running speed of the holding clips which independently control the rate of the right and left holding devices of the stretching apparatus is controlled.

One of the embodiments of the present invention is characterized in that in the production method of the optical film described in any one of Embodiments 1-5 above, the position of the right and left holding devices at the holding initiation position and the holding cessation position is detected on-line, the difference (being the retardation) between the right and left positions of the holding devices is determined, and based on the results, the right and left film holding distances via the right and left holding devices of the stretching apparatus is independently controlled, or controlled is the running rate of the holding clips which independently control the right and left holding devices of the stretching apparatus.

The retardation film described in one of the embodiments of the present invention is characterized in that the above retardation film is composed of an optical film produced employing the method described in any one of the embodiments described above.

Further, the optical film described in one of the embodiments of the present invention is characterized in that the above optical film is produced employing the method described in any one of the embodiments described above, and the resinous film is a cellulose ester film.

The optical film described in one of the embodiments of the present invention is characterized in that in the production method of an optical film employing a solution casting film forming method, during stretching a resinous film in-line, production is achieved by stretching, employing the method described in any one of the embodiments.

The in-line stretching described is schematically shown in FIG. 11.

Here, the raw material as a solution is cast as a film on a support. Then the film is solidified to a state hard enough to be transported. Then the film is peeled from the support and stretched while winding the film to yield a roll.

On the other hand, the off-line stretching is a method schematically shown is shown in FIG. 12. In this case, the film is rolled after casting. Then the film in a roll is again run out to stretch.

Further, the invention of the optical film described in Embodiment 11 is characterized in that the above optical film refers to the optical film described in above Embodiment 10, and during in-line stretching, the residual solvent amount in the resinous film is controlled within 5-50 percent by weight.

The invention of the optical film described in Embodiment 12 is characterized in that in the production method of the optical film employing a melt casting film forming method, during in-line stretching of the resinous film, production is achieved by stretching, employing the method described in any one of Embodiments 1-7.

The melt casting film forming method is a method to cast the raw material at a high temperature without a solvent.

According to the invention of the production method of the optical film described in Embodiment 1 of the present invention, in the method for producing the optical film employing the stretching apparatus in which both right and left edges of a continuous resinous film are held while tension is applied in the transverse direction, and the above resinous film is stretched during conveyance, stretching is performed so that the slow axis (the optical slow axis) is substantially perpendicular (at an average value of 90°±1.5°) or substantially parallel (at an average value of 0°±1.5°) to the film conveying direction by independently controlling the film holding distance (the distance from the start of holding to the cessation of holding) of both edges employing device which hold edges. The film holding distance is allowed to differ between both right and left edges by independently controlling the distance of the portion holding each edge of a resinous film in a tenter stretching apparatus. As a result, a force which twists the resinous film is generated in the tenter, whereby it is possible to correct any deviation of the orientation angle caused by non-uniformity of conveying and drying facilities, other than the tenter, whereby effects are exhibited in which it is possible to produce an optical film which exhibits a uniform orientation angle in the transverse direction (being the TD direction) over almost the entire portion of the film, excellent retardation compensating performance, and a viewing angle enlarging function.

According to the invention of the production method of the optical film described in Embodiment 2, in the production method of the optical film described in Embodiment 1 above, right and left holding devices of the stretching apparatus are allowed to differ in the right and left film holding distance by changing the holding initiation position (the clip closer arranging position) at the right and the left. As a result, a force which twists the resinous film is generated in the tenter, whereby it is possible to correct any deviation of the orientation angle caused by non-uniformity of conveying and drying facilities, other than the tenter, whereby effects are exhibited in which it is possible to produce an optical film which exhibits uniform orientation angle in the transverse direction (being the TD direction) over almost the entire portion of the film.

Further, according to the production method of the optical film described in Embodiment 3, in the production method of the optical film described in Embodiment 1 above, the right and left film holding distances are allowed to differ in such a manner that the right and left holding devices of the stretching apparatus cause the right and left holding cessation positions (the clip opener arranging positions) to differ. Therefore, a force which twists the resinous film is generated in the tenter, whereby it is possible to correct any deviation of the orientation angle caused by non-uniformity of conveying and drying facilities, other than the tenter, whereby effects are exhibited in which it is possible to produce an optical film which exhibits uniform orientation angle in the transverse direction (being the TD direction) over almost the entire portion of the film.

According to the invention described in Embodiment 4, in the production method of the optical film described in Embodiment 1 above, the right and left film holding distances are allowed to differ as a result of difference in the right and left distances of the endless track rail to move the connected holding devices which hold both right and left edges of the continuous resinous film, and result in tension in the transverse direction. For example, when the number of left clips is the same as the number of right clips and the left rail length differs from the right rail length, the distance between clips differs slightly between the right and the left. Even though the variation amount between clips is minute, several hundred to several thousand clips are employed, whereby the right and left film holding distances differ substantially. In such a manner, a force which twists the resinous film is generated in the tenter, whereby it is possible to correct any deviation of the orientation angle caused by non-uniformity of conveying and drying facilities other than the tenter, whereby effects are exhibited in which it is possible to produce an optical film which exhibits uniform orientation angle in the transverse direction (being the TD direction) over almost the entire portion of the film.

Further, according to the invention of the production method of the optical film described in Embodiment 5, in the method for producing an optical film employing a stretching apparatus in which both right and left edges of a continuous resinous film are held while tension is applied in the transverse direction and the above resinous film is stretched during its conveyance, stretching is performed so that the optical slow axis is substantially perpendicular (at an average value of 90°±1.5°) or substantially parallel (at an average value of 0°±1.5°) to the film conveying direction by independently controlling the rate of right and left holding devices of the above stretching apparatus, whereby effects are exhibited in which a force which twists the resinous film is generated not only by varying the right and left resinous film holding distances but also by allowing the running speed of the right and left clips to differ, resulting in the correction of any deviation of the orientation angle.

Further, the invention of Embodiment 6 relates to a production method of an optical film described in any one of Embodiments 1-5 above, in which the orientation angle of the resinous film prior to winding is measured on-line, and based on the results, right and left film holding distances are independently controlled employing the right and left holding devices of the stretching apparatus, or controlled is the running speed of the holding clips which independently controls the rate of the right and left holding devices of the stretching apparatus is controlled. Even though the resinous film is produced under fixed conditions, the orientation angle varies due to minute differences of materials and facilities. Thus, prior to winding the resulting product, the orientation angle is determined on-line and the results are subjected to feed-back, to adjust the film holding distance or the running speed, whereby effects are exhibited in which it is possible to also produce uniform resinous film in the longitudinal direction.

Further, the invention of Embodiment 7 relates to a production method of an optical film described in any one of Embodiments 1-5 above in which the position of the right and left holding devices at the holding initiation position and the holding cessation position are detected on-line, the retardation of the holding devices is determined, and based on these results, the right and left film holding distances via the right and left holding devices of the stretching apparatus are independently controlled, or controlled is the running speed of the holding clips which independently control the right and left holding devices of the stretching apparatus. By detecting the right and left clip positions at the entrance and exit of the tenter stretching apparatus, the characteristics of holding the right and left film are clearly determined. Namely, it is possible to quickly react to any variation of orientation angle during aging due to abrasion of bearings of the tenter holding devices. By controlling within the desired difference between the right and left distances based on the resulting data, a force which twits the resinous film is generated, whereby effects are exhibited in which it is possible to correct any deviation of the orientation angle.

The invention of the retardation film described in Embodiment 8 relates to a film which is produced employing the production method of optical film described in any one of above Embodiments 1-7, whereby effects are exhibited in which the orientation angle is uniform in the transverse direction (the TD direction) over almost the entire portion of the film; and excellent retardation compensating capability and viewing angle enlarging function are exhibited.

Further, the invention of the optical film described in Embodiment 9 relates to production employing the method described in any one of Embodiments 1-7 above, and further relates to a resinous film composed of a cellulose ester film, whereby effects are exhibited in which the orientation angle is uniform in the transverse direction (the TD direction) over almost the entire portion of the film, and excellent retardation compensating capability, and a viewing angle enlarging function are exhibited.

Still further, the invention of the optical film described in Embodiment 10 relates to production employing the stretching method described in any one of Embodiments 1-7 above during in-line stretching employing the solution casting film forming method, whereby effects are exhibited in which the orientation angle is uniform in the transverse direction (the TD direction) over almost the entire portion of the film, and excellent retardation compensating capability and viewing angle enlarging function are exhibited.

The invention of the optical film described in Embodiment 11 relates to the optical film described in Embodiment 10 above in which the residual solvent amount in the resinous film during stretching is controlled within 5-50 percent by weight. In the solution casting method, when the residual solvent amount is excessively low during stretching, the resulting film becomes relatively hard, whereby greater control is required, resulting in poor controllability. On the other hand, when the residual solvent amount in the resinous film is excessively high, the resulting film is soft and delicate control is also required, resulting in difficulty of optimal control. By controlling the residual solvent amount to within the above range, effects are exhibited in which it is possible to obtain an optical film which exhibits excellent controllability during stretching, uniform orientation angle in the transverse direction (the TD direction) over almost the entire portion of the film, and excellent retardation compensating capability, as well as an excellent viewing angle enlarging function.

Still further, the invention of an optical film described in Embodiment 12 relates to the production method of an optical film employing the melt casting film forming method in which production is performed in such a manner that stretching is conducted employing the method described in any one of Embodiments 1-7 during stretching, whereby effects are exhibited in which the orientation angle is uniform in the transverse direction (the TD direction) over almost the entire portion of the film, and excellent retardation compensating capability as well as a viewing angle enlarging function is exhibited.

BRIEF DESCRIPTIONS OF THE DRAWINGS

FIG. 6a is a schematic plan view showing the fourth embodiment of the present invention.

FIG. 6b is a schematic front view showing the same as FIG. 6a.

DESCRIPTION OF THE PREFERRED EMBODIMENTS

Figure 1:
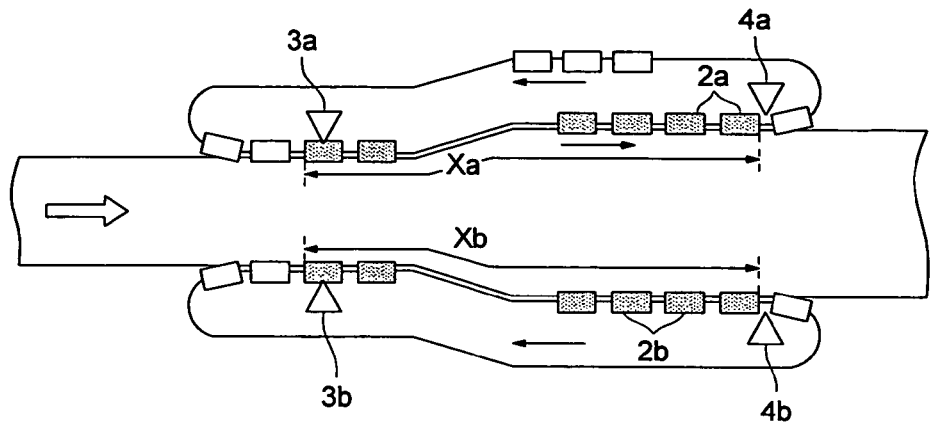
FIG. 1 is a schematic plan view showing the common embodiment of a tenter stretching apparatus.

The embodiments of the present invention will now be described.

The optical film of the present invention may be produced employing either a solution casting film forming method or a melt casting film forming method.

Examples of the materials of a solution casting film forming method include; cellulose ester, polycarbonate, cycloolefin, and polyimide. However, the present invention is not limited to them so far as the material is well dissolved in a solvent.

Examples of the materials of a melt casting film forming method include; polyester, polyethylene, polystyrene, polymethylmethacrylate, in addition to the above-described cellulose ester, polycarbonate, cycloolefin, and polyimide. The materials having an appropriate melting point can be used.

Cases will be described in which the optical film of the present invention is produced employing the solution casting film forming method. Preferably employed as cellulose ester are cellulose triacetate, cellulose acetate propionate, cellulose diacetate, and cellulose acetate propionate butyrate. In the case of cellulose triacetate, it is particularly preferred that the degree of polymerization is 250-400, while the amount of bonded acetic acid is 54-62.5 percent.

Cellulose esters which are synthesized employing cotton linters or wood pulp may be employed individually or blended.

It is practical to synthesize cellulose esters employed in the present invention, based on the method, for example, described in JP-A No. 10-45804.

When the number average molecular weight of cellulose esters is excessively low, the resulting strength is insufficient, while when it is excessively high, the viscosity of the resulting solution occasionally is excessively high, which it is preferably 70,000-300,000, but is more preferably 80,000-200,000.

It is preferable to use a larger amount of cellulose esters synthesized employing cotton linters, which exhibit the desired peeling properties from a rotating metal support composed of a looped belt or a drum, resulting in higher productivity. Further, in order to markedly enhance ease of peeling, the ratio of synthesized cellulose esters employing cotton linters is preferably at least 60 percent by weight, is more preferably at most 85 percent by weight, but is most preferably 100 percent by weight.

In order to reduce dimensional changes, it is preferable to use a cellulose ester film of the degree of substitution of the total acyl group of at most 2.75. Specifically, the cellulose ester film of at most 2.70 results in pronounced desired effects.

In the present invention, in view of minimizing degradation of optical film composed of a cellulose ester, when they are used in liquid crystal units which are employed outdoors, it is preferable that UV absorbers are incorporated. Preferably employed as UV absorbers may be those which exhibit sufficient absorption of ultraviolet rays at a wavelength of at most 370 nm and minimal absorption of visible light at a wavelength of at least 400 nm. For example, transmission at a wavelength of 380 nm is preferably 20 percent, is more preferably at most 10 percent, but is most preferably at most 5 percent.

Listed as UV absorbers may, for example, be oxybenzophenone based compounds, benzotriazole based compounds, salicylic acid ester based compounds, benzophenone based compounds, cyanoacrylate based compounds, nickel complex based compounds, or polymer type UV absorbers described in JP-A No. 6-148430. However, the present invention is not limited thereto.

Specific examples of UV absorbers will now be listed. However, the present invention is not limited thereto UV-1: 2(2'-hydroxy-5'-methylphenyl)benzotriazole UV-2: 2(2'-hydroxy-3',5'-di-tert-butylphenyl)Benzotriazole UV-3: 2(2'-hydroxy-3'-tert-butyl-5'-methylphenyl)benzotriazole UV-4: 2(2'-hydroxy-3',5'-di-tert-butylphenyl)-5-chlorobenzotriazole UV-5: 2(2'-hydroxy-3'(3",4",5",6"-tetrahydrophthalimidomethyl)-5'-methylphenyl)benzotriazole UV-6: 2,2-methylenebis(4-(1,1,3,3-rtetramethylbutyl)-6-(2H-benzotriazole-2-yl)phenol UV-7: 2(2'-hydroxy-3'-tert-butyl-5'-methylphenyl)-chlorobenzotriazole UV-8: 2-(2H-benzotriazole-2-yl)-6-8straight chain or branched chain dodecyl)-4-methylphenol (TINUVIN 171, produced by Ciba Specialty Chemicals Co.)

UV-9: a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(chloro-2H-benzotriazole-2-yl)phenyl]propionate (TINUVIN 109, produced by Ciba Specialty Chemicals Co.)

UV-10: 2,4-dihydroxybenzophenone

UV-11: 2,2'-di-hydroxy-4-methoxybenzophenone

UV-12: 2-hydroxy-4-methoxy-5-sulfobenzophenone

UV-13: bis(2-methoxy-4-hydroxy-5-benzoylphenylmethane)

In the present invention, preferably employed in cellulose ester films may be benzotriazole based UV absorbers and benzophenone based UV absorbers which exhibit high transparency as a UV absorber, and effectively minimize degradation of polarizing plates and liquid crystals. Of these, particularly preferred are benzotriazole UV absorbers which are less colored. Preferred as UV absorbers are those which result in neither bleed-out nor volatilization during the casting process.

In the present invention, the added amount of UV absorbers is preferably 0.1-10 percent by weight with respect to the cellulose ester components, but is most preferably 0.5-5 percent by weight.

Further, in the present invention, these UV absorbers may be employed singly or in combinations of at least two different types.

UV absorbers are added employing a method in which UV absorbers are dissolved in organic solvents such as alcohol, methylene chloride, or dioxosilane and added to a dope, or UV absorbers are directly added to a dope composition. UV absorbers such as inorganic powders, which are insoluble in organic solvents, are dispersed into a mixture of organic solvents and cellulose esters employing a dissolver or a sand mill and the resulting dispersion is added to a dope.

Further, in the present invention, if desired, minute particles of such as silicon dioxide may be incorporated into cellulose ester films as a matting agent. Since it is possible to lower film haze, it is preferable that minute particles such as silicon dioxide are subjected to a surface treatment employing organic substances. Listed as preferred organic substances for the surface treatment are halosilanes, alkoxysilanes, silazane, and siloxane. Minute particles of a relatively large average diameter result in greater matting effects, while those of a relatively small average diameter results in desired transparency. Accordingly, the averaged diameter of the primary articles of the minute particles is preferably 5-50 nm, but is more preferably 7-14 nm.

Listed as minute silicon dioxide particles employed in the present invention are AEROSIL-200, 200V, 300, R972, R972V, R974, R202, R812, OX50, and TT600, produced by Aerosil Co., Ltd. Of these, preferably listed are AEROSIL-200, 200V, R972, R972V, R974, R202 and R812.

In the present invention, the added amount of the above minute particles is preferably 0.04-0.4 percent by weight with respect to the cellulose esters, is more preferably 0.05-0.3 percent by weight, but is most preferably 0.05-0.2 percent by weight.

In the above method of the present invention, solvents which are employed to dissolve cellulose esters may be employed individually or in combination. However, in view of enhancing production efficiency, it is preferable that good and poor solvents are mixed and then employed. Further, it is preferable to increase the amount of good solvents since solubility of cellulose esters is enhanced to decrease film foreign matter due to the presence of minute insoluble substances. The mixing ratio of good solvents to poor solvents is preferably in the range of the poor solvents of 70-98 percent by weight and the poor solvents of 2-30 percent by weight.

Good solvents, as cited in the present invention, are defined as those which individually dissolve cellulose esters, while poor solvents are defined as those which individually swell cellulose esters but do not dissolve them.

Good solvents employed in the present invention are not particularly limited. In the case of cellulose triacetates, examples include organic halogen compounds such as methylene chloride and dioxolans, while in the case of cellulose acetate propionate, examples include methylene chloride, acetone, and methyl acetate. Further, poor solvents are also not particularly limited, and for example, preferably employed are methanol, ethanol, i-propyl alcohol, n-butanol, cyclohexane, acetone, and cyclohexanone.

It is possible to produce the optical film composed of the cellulose ester film prepared employing the solution casting film forming method while referring to methods described, for example, in U.S. Pat. Nos. 2,492,978, 2,739,070, 2,739,069, 2,492,977, 2,336,310, 2,367,603, and 2,607,704; British Patent Nos. 64,071 and 735,892; and Japanese Patent Publication Nos. 45-9074, 49-4554, 49-5614, 60-27562, 61-39890, and 62-4208.

In the production method of the optical film composed of cellulose ester film of the present invention, in view of enhanced mechanical strength and dimensional stability, it is preferable that plasticizers are incorporated into the cellulose ester film. The added amount is preferably 3-30 percent by weight with respect to the cellulose ester film which has been acylated employing an acetyl group and an acyl group having 3-4 carbon atoms, is more preferably 10-30 percent by weight, but is most preferably 15-25 percent by weight. Generally, as the added amount of plasticizers increases, the dimensional variation tends to increase. However, based on the method of the present invention, it is possible to markedly lower the dimensional variation ratio.

Plasticizers usable in the present invention are not particularly limited. Preferably employed may be phosphoric acid ester based plasticizers, phthalic acid ester based plasticizers, trimellitic acid ester based plasticizers, pyromellitic acid based plasticizers, glycolate based plasticizers, citric acid ester based plasticizers, and polyester based plasticizers.

Preferably employed as phosphoric acid ester based plasticizers may be triphenyl phosphate, tricresyl phosphate, cresyl diphenyl phosphate, octyl diphenyl phosphate, diphenyl biphenyl phosphate, trioctyl phosphate, and tributyl phosphate. Further, preferably employed as phthalic acid ester based plasticizers may be diethyl phthalate, dimethoxyethyl phthalate, dimethyl phthalates, dioctyl phthalate, dibutyl phthalate, di-2-ethylhexyl phthalate, and butyl benzyl phthalate. Preferably employed as trimellitic acid based plasticizers may be tributyl trimellitate, triphenyl trimellitate, and trimethyl trimellitate. Preferably employed as pyromellitic acid ester plasticizers may be tetrabutyl pyromellitate, tetraphenyl pyromellitate, and tetraethyl pyromellitate. Preferably employed as glycolic acid ester based plasticizers may be triacetin, tributyrin, ethylphthalyl ethyl glycolate, methylphthalyl ethyl glycolate, and butylnaphthalyl butyl glycolate. Preferably employed as citric acid ester based plasticizers may be trimethyl citrate, tri-n-butyl citrate, acetyltriethyl citrate, acetyl-tri-n-butyl citrate, and acetyltri-n-(2-ethylhexyl)citrate. Employed as polyester based plasticizers may be copolymers of dibasic acids such as an aliphatic dibasic acid, an alicyclic dibasic acid, or an aromatic dibasic acid with glycol. Aliphatic dibasic acids are not particularly limited and adipic acid, sebacic acid, phthalic acid, terephthalic acid, and 1,4-cyclohexylcroboxylic acid may be employed. Further, employed as glycols may be ethylene glycol, diethylene glycol, 1,3-propylene glycol, 1,2-propylene glycol, 1,4-butylene glycol, 1,3-butylene glycol, and 1,2-butylene glycol. These dibasic acids and glycols may be employed individually or in combinations of at least two types. In view of compatibility with cellulose resins, the molecular weight of polyesters is preferably in the range of 500-2,000 in terms of weight average molecular weight.

Further, in the methods of the present invention, the vapor pressure of employed plasticizers is preferably at most 1,333 Pa, preferably at 200° C., is more preferably at most 666 Pa, but is most preferably 1-133 Pa. Plasticizers which exhibit non-volatility are not particularly limited. Listed as examples are arylene bis(diaryl phosphate)ester, tricresyl phosphate, and trimellitic acid tri(2-ethylhexyl). These plasticizers may be employed individually or in combinations of at least two types.

In the production method of an optical film composed of the cellulose ester film of the present invention, the solid concentration in a dope, which is a cellulose ester solution, is commonly 10-40 percent by weight, while the dope viscosity during casting in the casting process is controlled to within the range of 1-200 poise.

Herein, cellulose esters are dissolved employing methods such as a stirring dissolution method in a dissolution tank, a heating dissolution method, or an ultrasonic dissolution method. A method is more preferred in which while stirring, dissolution is performed under pressure application while heating within the range which is at least at the boiling point of solvents used at normal pressure and in which solvents do not boil, due to prevention of formation of lump-shaped insoluble substances called "gel" or "mamako". Further, also employed may be the cooling dissolution method described in JP-A No. 9-95538 or a high-pressure dissolution method described in JP-A No. 11-21379.

A method is also preferably employed in which after wetting or swelling cellulose esters upon being blended with poor solvents, dissolution is performed by blending with good solvents. During this operation, an apparatus may be divided into a device in which cellulose esters and poor solvents are blended to result in wetting or swelling, and a device in which the resulting mixture is blended with good solvents to achieve dissolution.

In the present invention, the types of pressure vessels are not particularly limited as long as they can function at the specified pressure, and can perform stirring and heating under the pressure. Other than that, the pressure vessel is appropriately fitted with measuring instruments such as a manometer and a thermometer. Pressure may be applied employing a method in which inert gasses such as nitrogen gas are subjected to press fitting or via an increase in vapor pressure of solvents due to heating. It is preferable that from the exterior, heating is performed, for example, a jacket type vessel is preferred since the temperature is easily controlled.

Heating temperature after the addition of a solvent is preferably higher than the boiling point of the added solvent. In the case of a mixture of at least two solvents, it is preferable that the mixture is heated to a temperature higher than the boiling point of the solvent whose boiling point is lower than the others and to a temperature lower than the boiling point of the mixture. When the heating temperature is excessively high, the required pressure also becomes relatively high, resulting in degradation of productivity. Heating temperature is preferably in the range of 20-120° C., is more preferably in the range of 30-100° C., but is most preferably in the range of 40-80° C. Further, the pressure is controlled so that solvents do not boil at the specified temperature.

Other than cellulose esters and solvents, additives such as necessary plasticizers or UV absorbers are previously mixed to the solvents, and dissolved or dispersed. The resulting solution or dispersion may be charged into solvents prior to dissolution of cellulose esters, or charged into a dope after dissolution of cellulose esters.

Cellulose esters are dissolved and removed from the vessel while being cooled, or drawn from the vessel employing a pump, and then cooled employing a heat exchanger. Thereafter, the resulting cellulose ester dope is fed for casting. During this operation, the cooling temperature may reach room temperature.

A mixture of cellulose ester raw materials and solvents is subjected to dissolution in a dissolution apparatus fitted with a stirrer. During this operation, it is preferable that the peripheral rate of the stirring blades is at least 0.5 m/second and dissolution is completed while stirring for at least 30 minutes.

In the method of the present invention, it is essential to filter a cellulose ester dope to remove foreign substances, especially those which may be recognized as images. It may be mentioned that quality of an optical film is dependent on the above filtration.

Preferred filters for the above filtration are those which exhibit smaller absolute filtration accuracy. However, when the absolute filtration accuracy is excessively small, problems occur in which clogging tends to result, whereby it is required to frequently replace filters, which lowers productivity.

Due to that, in the present invention, the absolute filtration accuracy of filters employed for the cellulose ester dope is preferably at most 0.008 mm, is more preferably in the range of 0.001-0.008 mm, but is still more preferably in the range of 0.003-0.006 mm.

The filter materials are not particularly limited and it is possible to use common filters. However, plastic fiber filters such as polypropylene or TEFLON (a registered trade name) and metal filters such as stainless steel strands are preferred since no filter strands dislodge.

In the present invention, it is possible to filter the cellulose ester dope employing common methods. However, a method is preferred in which filtration is performed under application of pressure while heating in the range of a temperature which is higher than the boiling point of solvents at normal pressure since the pressure difference between the front and rear of the filter (hereinafter also referred to as the filtration pressure) is negligible.

The filtration temperature is preferably in the range of 45-120° C., is more preferably in the range of 45-70° C., but is still more preferably in the range of 45-55° C.

Filtration pressure is preferably at most 3,500 kPa, is more preferably at most 3,000 kPa, but is still more preferably at most 2,500 kPa. Incidentally, it is possible to control the filtration pressure by appropriately selecting the filtration flow rate and filtration area.

When cellulose esters, which are not subjected to substitution of an acyl group or at most a relatively low degree of substitution, are incorporated in cellulose as a raw materiel, foreign matter defects (hereinafter also referred to as bright spots or foreign matter bright spots) occasionally result and such phenomena are observed as follows. A cellulose ester film is placed between two polarizing plates crossing at right angles (crossed Nicols) and light is exposed to one side while the other side is viewed employing an optical microscope (at a factor of 50). When no cellulose ester film defects result, light is not transmitted, resulting in a black image, whereby nothing can be seen. However, when foreign matter is present, light leaks through and a phenomenon occurs in which foreign matter particles are seen as bright spots. As the diameter of bright spots increases, commercial viability decreases when applied to liquid crystal display devices. The diameter of bright spots is preferably at most 10 µm, but is more preferably at most 8 µm. The diameter of bright spots, as described herein, refers to the diameter which is determined in such a manner that a bright spot is approximated to a genuine circle.

When the number of foreign matter bright spots at the above diameter is at most 400/cm$^2$, the resulting products are commercially viable. The number is preferably at most 300/cm$^2$, but is more preferably 200/cm$^2$. In order to lower the number of foreign matter bright spots and to also reduce their size, it is required that minute foreign matter particles are removed via filtration.

Incidentally, it is, for example, preferable to use the method described in JP-A No. 2000-137115, in which crushed cellulose ester films which have been cast are added to a dope at a certain ratio and are used as a raw material of cellulose esters along with additives, since it is thereby possible to reduce foreign substance bright spots.

Employing the method of the present invention, an optical film composed of cellulose ester film is produced as follows. First, cellulose esters are dissolved in a solvent mixture composed of good solvents and poor solvents, and the aforesaid plasticizers and UV absorbers are added to the resulting solution, whereby a cellulose ester solution (being a dope) is prepared.

It is possible to carry out casting onto a support composed of a looped stainless belt in the common temperature range of 0° C.—the boiling point of solvents. Further, it is possible to carry out casting in the temperature range of 5° C. to the boiling point of the solvent −5° C., but it is more preferable that casting is carried out onto a support maintained at 5-30° C. During this operation, it is required to control the ambient humidity to at least the dew point.

Further, dope which has been controlled to reach a viscosity of 1-200 poise is cast from a casting die onto a support so that the layer thickness becomes almost uniform. Subsequently, drying is carried out employing a drying air flow so that the temperature of the cast film (being the web) is at most the boiling point of the solvents when the residual solvent amount in the cast film is at least 200 percent with respect to the weight of solids and the temperature of the same is in the range of at most the boiling point of solvents plus 20° C. during at most 200 percent to peeling.

In order to dry and solidify the web to reach the strength allowing peeling from the support, it is preferable that drying is carried out so that the residual solvent amount in the web reaches at most 150 percent by weight, but it is more preferable that it reaches 50-120 percent.

When the web is peeled from the support, its temperature is preferably 0-30° C. Further, since immediately after peeling of the web from the support, the web temperature is temporarily rapidly lowered due to solvent vaporization from the side of the web which has been brought into close contact with the support, whereby water vapor and solvent vapor in the ambient atmosphere tends to condense, therefore the web temperature during peeling is more preferably 5-30° C.

Herein, the residual solvent amount in the web is expressed by the formula below.

Residual solvent amount(weight %)={$(M-N)/N$}100 wherein M represents the weight of the web at an optional point, and N is the weight of the web at the point after being dried at 110° C. for three hours.

In the drying process of a web (or a resinous film), drying is commonly performed while conveying the web employing systems such as a roller suspension system, a pin tenter system, or a clip tenter system.

After peeling, the web is conveyed, for example, into a primary drying apparatus. In the primary drying apparatus, when viewed from the side, the web is made to meander employing a plurality of staggered conveying rollers. During the above operation, the web is dried by a heated air which is blown from the ceiling and discharged at the bottom portion of the drying apparatus.

Subsequently, the resulting film (in a sheet form) is uniaxially stretched, whereby molecules are oriented. Stretching methods are not particularly limited, and it is preferably to use the pin tenter or the clip type tenter which are known in the art. Stretching may be performed in the longitudinal direction, the transverse direction or an optimal direction (an oblique direction). However, the stretching in the transverse direction is preferred since it is possible to perform lamination with a polarizing film in the form of a roll. By transverse direction stretching, the slow axis of the optical film composed of a thermoplastic film is arranged in the transverse direction. On the other hand, the transmission axis of the polarizing film is commonly in the transverse direction. It is possible to achieve an excellent viewing angle by loading a liquid crystal display device with a polarizing plate which is laminated so that the transmission axis of the polarizing film and the slow axis of the optical film are parallel.

Specifically, when a drying process after peeling from the support is performed, the web tends to contract in the transverse direction. As the drying temperature is raised, contraction increases. It is preferable that in order to achieve the desired flatness of the finished film, drying is performed to make the resulting contraction as little as possible. In view of this aspect, preferred is the method/tenter system described in JP-A No. 62-46625, in which drying is performed in such a manner that in the entire drying process or in a part of the drying process, both edges of the web are held by clips so that the desired width is maintained.

It is possible to decide stretching conditions, such as temperature and magnification ratio, to achieve desired retardation characteristics. The degree of stretching ratio is commonly 1.1-2.0 times, but is preferably 1.2-1.5 times. The stretching temperature is commonly in the range of the glass transition temperature (Tg) of the film (i.e. compounds of a resin and a plasticizer), being −40° C. to Tg+50° C., but is preferably in the range of Tg−40° C. to Tg+40° C. When the stretching magnification ratio is excessively small, the desired retardation is occasionally not achieved, while when it is excessively large, ripping may occasionally result. When the stretching temperature is excessively low, ripping occasionally results, while when it is excessively high, the desired retardation is occasionally not achieved.

In cases in which the retardation of the thermoplastic resinous film prepared employing the above method needs to be revised to the targeted value, a film may be stretched or contracted in the longitudinal or transverse direction. Contraction in the longitudinal direction may be carried out employing methods such as one in which transverse stretching is temporarily clipped out to result in relaxation in the longitudinal direction, or the other method in which a film is allowed to contract by gradually decreasing the distance between adjacent clips. The latter method is performed in such a manner that by employing a common simultaneous biaxial stretching apparatus, the distance between adjacent clips is smoothly and gradually decreased by driving clip portions employing, for example, a pantagraph system, or a linear drive system.

It is possible to carry out holding and stretching in a tenter at any position immediately after peeling when the residual solvent ratio is 50-150 percent by weight, to just prior to winding when the residual solvent ratio is substantially zero percent by weight. However, as noted in the present invention, it is preferable that holding and stretching is carried out when the range of a residual solvent ratio is 5-10 percent.

It is a common practice that a tenter is divided into several temperature zones in the film conveying direction. Temperature during stretching is selected to result in desired physical properties and flatness. In some cases, the temperature of the drying zones prior to and after the tenter is selected which is different from the temperature during stretching due to several reasons. For example, when the ambient temperature of the drying zone prior to the tenter is different from the temperature in the tenter, it is general practice that the temperature of the zone near the tenter entrance is set at an intermediate temperature between the temperature of the drying zone prior to the tenter and the temperature at the central portion of the tenter. When the temperature after the tenter and the temperature in the tenter differ, the temperature of the zone nearer the tenter exit is also set at an intermediate temperature between the temperature after the tenter and the temperature in the tenter. Temperature of drying zones prior to and after the tenter is commonly 30-120° C., but is preferably 50-100° C. The temperature of the stretching section in the tenter is 50-180° C., but is preferably 80-140° C., while the temperature of the entrance or exit section of the tenter is appropriately selected from the intermediate temperatures.

A stretching pattern, namely the locus of clips is selected based on the desired optical properties and flatness of the film in the same manner as temperature and varies. A pattern is frequently employed in which a definite width is maintained for some time after the initiation of holding, subsequently stretching is performed, and after stretching, a definite width is again maintained. It is common that in order to control film vibration due to releasing of clipping, width relaxation is carried out near the termination of clipping near the tenter exit.

Even though the stretching pattern also relates to the stretching rate, the stretching rate is commonly 10-1,000 percent/minute, but is preferably 100-500 percent/minute. The above stretching rate is not constant in the cases in which the locus of clips is curved and gradually varies in the film base running direction.

Further, the web (being the film) after drying employing the above tenter system is subsequently introduced into a secondary drying apparatus. In the secondary drying apparatus, when viewed from the side, the web is allowed to meander employing a plurality of staggered conveying rollers. During the above operation, the web is dried via heated air which is blown from the ceiling and discharged at the bottom portion of the drying apparatus, and the web is then wound by a winder as a cellulose ester film product.

In the production method of optical film composed of the cellulose ester film of the present invention, methods to dry a web are not particularly limited, and drying is commonly performed employing heated air flow, infrared radiation, heating rollers, and microwaves. Of these, it is preferred to perform drying employing the heated air flow due to its simplicity. The drying temperature is preferably 40-150° C., but is more preferably 80-130° C. which enhances flatness and dimensional stability.

As noted above, in the web drying process, the web peeled from the support is further dried. In order to produce a film of excellent dimensional stability, the final residual solvent ratio is preferably at most 3 percent by weight, is more preferably at most 1 percent by weight, but is still more preferably 0.5 percent by weight.

The above processes from casting to post-drying may be performed in an ambience of air or an inert gas such as nitrogen. In this case, the drying ambience is naturally constituted taking into consideration of the explosion limit concentration of solvents.

Incidentally, it is preferable that during the pre-step of introducing the winding process, both edges of the cellulose ester film, having completed the conveying drying process, are subjected to an embossing treatment employing an embossing device. Employed as such an embossing device may be the one described, for example, in JP-A No. 63-74850.

In the various methods of the present invention, employed as a winding machine related to the production of cellulose ester film may be commonly used ones, and it is possible to achieve winding employing methods such as a constant tension method, a constant torque method, a taper tension method, or a constant inner stress programmed tension control method.

In the present invention, the thickness of the optical film after winding varies depending on its intended use. The thickness of the finished film used in the present invention is typically in the range of 30-200 μm, is preferably in the range of 40-120 μm, but is most preferably in the range of 40-100 μm due to the recent trend of thinner film.

When the optical film of the present invention is produced employing a melt casting film forming method, employed as UV absorbers may be those which are almost the same as the UV absorbers employed in the production of the optical film employing the above solution casting film forming method.

The blended amount of these UV absorbers is preferably in the range of 0.01-10 percent by weight with respect to the thermoplastic resins, but is more preferably 0.1-5 percent by weight. When the used amount is excessively small, UV absorbing effects are occasionally insufficient, while when it is excessively large, film transparency is occasionally degraded. UV absorbers are preferred which exhibit high stability against heat.

In the present invention, in order to provide a film with lubricating properties, it is preferable to add minute particles. Employed as minute particles used in the present invention may be either inorganic or organic compounds as long as heat resistance is exhibited during melting. Preferred as inorganic compounds are silicon containing compounds, silicon dioxide, aluminum oxide, zirconium oxide, calcium carbonate, talc, clay, calcined kaolin, calcined calcium silicate, calcium silicate hydrate, aluminum silicate, magnesium silicate, and calcium phosphate. Of these, more preferred are silicon containing inorganic compounds and zirconium oxide. Of these, silicon dioxide is particularly preferred since it is thereby possible to minimize haze. When the optical film of the present invention is prepared employing a melt casting film forming method, most of the same matting agents which are employed in the above liquid casting film forming method may be employed.

In cases in which the optical film of the present invention is produced employing a melt casting film forming method, the above methods includes a melt-extrusion method such as a method which uses a T-die or an inflation method, a calender method, a heat-press method, and an injection molding method. Of these, the method, which uses a T-die, is preferred since it results in maximum thickness uniformity and ease achieving a thickness of about 50 to about 500 μm, and maximizes uniform film thickness and uniform retardation. In the extrusion method employing a T-die, the aforesaid polymers are melted at a melting temperature, extruded onto a cooling drum from the T-die in the form of a film (sheet shaped), cooled, solidified, and peeled from the cooling drum. The resulting film exhibits excellent thickness accuracy of the film, whereby it is preferable to use it in the present invention.

It is possible to perform the above extrusion under similar conditions which are employed for other thermoplastic resins, such as polyester. For example, cellulose esters dried by heated air flow or under vacuum are melted at an extrusion temperature of 200-300° C., employing a uniaxial or biaxial type extruder, filtered employing a leaf-disk type filter to remove foreign matter, cast onto a support in the form of film from the T-die, and solidified on a cooling drum. When introduced to the extruder from the feeding hopper, it is preferable to minimize oxidation and decomposition under reduced pressure or in an ambience of an inert gas.

It is preferable that extrusion is performed employing, for example, a gear pump so that the specified amount is fed. Further, preferably employed as a filter to remove foreign matter is a sintered stainless steel fiber filter. The sintered stainless steel fiber filter is prepared in such a manner that stainless steel fibers are intertwined, pressed, and sintered so that contacting portions are integrated. Consequently, it is possible to control filtration accuracy by changing the fiber thickness and the density via the degree of compression. A multilayered filter is preferred in which high and low accuracy filtration layers are stacked. Further, filters are preferred which are constituted so that the filtration accuracy is successively enhanced or employing a method in which high and low filtration accuracy is repeated, since it is thereby possible to extend the filtration life of the filter and to enhance supplementary accuracy for filtering foreign matter and gels.

When a die is subjected to abrasion or adhesion of foreign matter, streaking problems occasionally result. Such a problem is called die lines. In order to minimize surface problems such as die lines, it is preferable that the piping from the extruder to the die is arranged so that the holdup portions of resins are minimized. It is preferable to employ dies which do not suffer from abrasion in the interior and lips free from abrasion occasionally, volatile components from resins are deposited on the periphery of dies which also result in die lines. Consequently, it is preferable to draw in air incorporating volatile components. Further, since deposition occasionally occurs on electrostatic voltage applying devices, it is preferable to minimize the deposition by applying alternating current, or employing other heating device.

Additives such as a plasticizer may previously be blended with resins, or kneaded during transport to the extruder. In order to achieve uniform addition, it is preferable to employ mixing devices such as a static mixer.

The temperature of a cooling drum is preferably at most the glass transition temperature of thermoplastic compound containing a resin and a plasticizer. In order that resins are brought into close contact with the cooling drum, it is preferable to employ methods such as one in which close contact is achieved by electrostatic application, a method in which close contact is achieved employing air pressure, a method in which close contact is performed by nipping the entire width or edges, or a method in which close contact is achieved by vacuum.

This thermoplastic resinous sheet molded employing the melt casting film forming method features low retardation (Rt) in the thickness direction, differing from molded sheets employing the solution casting film forming method, whereby stretching conditions which differ from the solution casting film forming method are occasionally required. In order to obtain desired optical and physical properties, in one case, stretching in the film transport direction and stretching in the film transverse direction are simultaneously or successively performed. Further, in another case, stretching only in the film transverse direction is performed. This stretching operation results in molecular orientation, whereby the resulting film is controlled to within the targeted retardation value.

Stretching methods are not particularly limited, but a preferable method is to use a pin tenter or a clip type tenter, which is known in the art. Stretching may be performed in the longitudinal direction, the transverse direction or an optimal direction (an oblique direction). However, stretching in the transverse direction is preferred since it is possible to perform lamination with a polarizing film in the form of a roll. By transverse direction stretching, the slow axis of the optical film composed of a thermoplastic film is arranged in the transverse direction. On the other hand, the transmission axis of the polarizing film is commonly in the transverse direction. It is possible to achieve an excellent viewing angle by loading a liquid crystal display device with a polarizing plate which has been laminated so that the transmission axis of the polarizing film and the slow axis of the optical film are parallel.

It is possible to decide stretching conditions such that the temperature and the magnification ratio achieve desired retardation characteristics. The stretching magnification ratio is commonly 1.1-2.0 times, but is preferably 1.2-1.5 times. The stretching temperature is commonly in the range of the glass transition temperature (Tg) of the resin constituting a sheet being −50° C. to Tg+50° C., but is preferably in the range of Tg−40° C. to Tg+40° C. When the stretching magnification ratio is excessively small, the desired retardation is occasionally not achieved, while when it is excessively large, breakage may occasionally result. When the stretching temperature is excessively low, breakage occasionally results, while when it is excessively high, the desired retardation is occasionally not achieved.

In cases in which the retardation of the thermoplastic resinous film prepared employing the above method is adjusted to the targeted value, a film may be stretched or contracted in the longitudinal or transverse direction. Contraction in the longitudinal direction may be carried out employing methods such as one in which transverse stretching is temporarily clipped out to result in relaxation in the longitudinal direction, or another method in which a film is contracted by gradually decreasing the distance between adjacent clips. The latter method is performed in such a manner that by employing a common simultaneous biaxial stretching apparatus, the distance between adjacent clips is smoothly and gradually reduced by driving clip portions employing, for example, a pantagraph system, or a linear drive system.

To correct flatness and enhance dimensional stability, a heat treatment zone is occasionally arranged prior to winding, but after stretching. For example, a zone is occasionally arranged in which temperature is maintained in the range of the glass transition temperature (Tg) of the films −30° C. to Tg for several tens of seconds to several tens of minutes, and the sheet is conveyed between staggered rollers.

The thickness of the optical film varies depending on its intended function. The thickness of the finished film used in the present invention is in the range of 30-200 μm, is preferably in the range of 40-120 μm, but is most preferably in the range of 40-100 μm due to the recent trend of thinner film. It is possible to control the thickness to the desired value by regulating the extrusion flow rate, the slit gap of the mouth ring of the die, and the rate of the cooling drum. It is preferable that a thickness detection device is employed and programmed feed-back data is submitted to each of the above devices to control the film thickness.

The resulting thermoplastic resinous film stretched in the transverse direction as above is subjected to molecular orientation due to the stretching and results in fixed retardation.

The optical film according to the present invention may be produced employing either the solution casting film forming method or the melt casting film forming method.

In cases in which the optical film of the present invention is produced employing the solution casting film forming method, even though representation in the drawings is abbreviated, a dope which is a raw material solution of a cellulose ester film is cast employing a casting die onto a support composed of a rotating looped metal belt. A dope film, namely a web, which is formed on the support via casting, travels approximately one round and is peeled by a peeling roller. The peeled web (being the film) is subsequently introduced into a stretching apparatus composed of a tenter.

In cases in which the optical film of the present invention is produced employing the melt casting film forming method, in an extrusion method employing the T-die as the melt casting film forming method, the aforesaid polymers are melted at the melting temperature, and the resulting melt is cast onto a cooling drum from the T-die in the from of film (sheet shaped), cooled, solidified, and peeled from the cooling drum. The peeled film is subsequently introduced into a stretching apparatus composed of a tenter.

The present invention will now be described with reference to drawings.

FIG. 1 is a schematic view of a common embodiment of tenter stretching apparatus 10. As shown in FIG. 1, in tenter 10, arranged are a pair of right and left rotation driving units (looped chains) 1a and 1b composed of a looped chain entrained around front and rear sprockets on both the right and left sides of the housing (not shown), and these rotation driving units 1a and 1b are provided with many clips 2a and 2b.

Herein, many clips 2a and 2b are connected to each other to finally form looped chains 1a and 1b and run on a guide rail (not shown) (similar to a monorail). These chains 1a and 1b are under tension via application of pressure to be not loose and are constituted so that the rail distance changes based the distance of chains 1a and 1b.

Devices which apply tension to these chains 1a and 1b are labeled "tensioners 5 and 6" (refer to FIGS. 4, 5, and 8), which change the tension on right and left chains 1a and 1b and thereby change the entire distance of looped chains 1a and 1b.

When clips 2a and 2b are closed by clip closers 3a and 3b which are provided at the entrance of the film F in the tenter, the holding of the edge of film begins and the film F is introduced in the tenter.

Further, the right and left edges of film F are held by clips 2a and 2b of tenter 10, and in such a state, film F is conveyed to the entrance of tenter 10. In tenter 10, the right and left edges of film F are held by clips 2a and 2b, and thereby film F is stretched while conveyed.

At the exit of the tenter 10, clip openers 4a and 4b are provided. Clips 4a and 4b open clips 2a and 2b resulting in ending holding of the film.

In FIG. 1, the shaded clip is in the state of holding the edge of the film, the non-shaded clip is in the state of non-holding the film.

Then, film F is conveyed into a drying apparatus (not shown), conveyed via all staggered conveying rollers in the housing of the drying apparatus, and dried by drying blown from a drying air blowing exit during conveyance, whereby a cellulose ester film is produced. The resulting film is then wound onto a winding roller (not shown).

Further, the conveying rate of film F is commonly 2-200 m/minute, but is preferably 10-100 m/minute.

The optical film according to the present invention is produced employing a method using stretching apparatus 10 in which the right and left edges of long resinous film F are held and stretched by applying tension in the transverse direction during conveyance. Stretching is performed so that the slow axis is substantially perpendicular (at an average value within $90°±1.5°$) or substantially parallel (at an average value within $0°±1.5°$) to the film conveying direction, by independently controlling film F holding distance (the distance from the start of holding to the cessation of holding) of both edges (Xa an and Xb), employing right and left edge holding devices (clips) 2a and 2b of above stretching apparatus 10.

The orientation angle, as described in the present invention, refers to the slow axis (or the delayed phase axis) in the thermoplastic resinous film plane. Further the orientation angle is determined employing an automatic double refractometer KOBRA-WIS/RT. The orientation angle is determined, for example, at 9 points at an interval of 3-10 cm in the transverse direction. It is preferable that all the orientation angles are within $±1.0°$.

Figure 10:
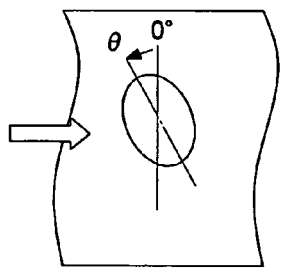
FIG. 10 is a schematic plan view showing the orientation angle of the slow axis of the film.
Figure 11:
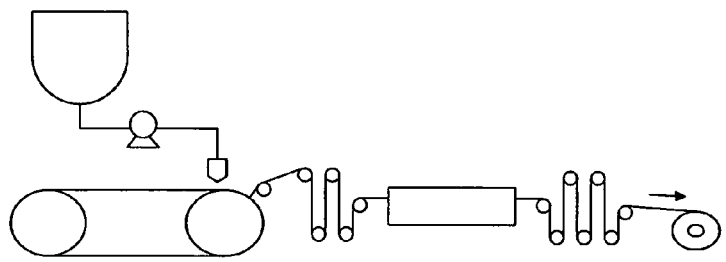
FIG. 11 is a schematic plan view showing the in-line stretching of the film.
Figure 12:
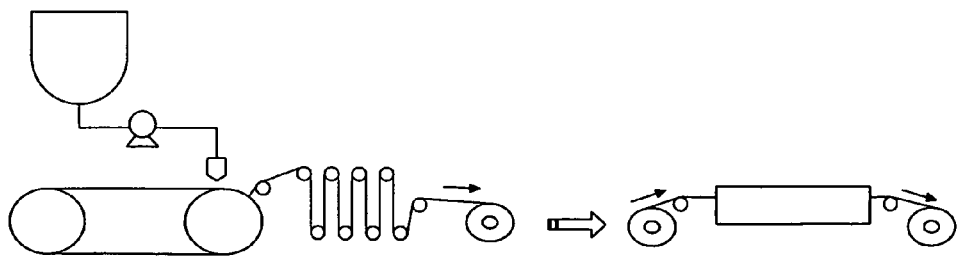
FIG. 12 is a schematic plan view showing the off-line stretching of the film.

FIG. 10 shows the orientation angle of the slow axis (designated as "θ") from a transverse direction (designated as 0°). After measuring the orientation angle of the slow axis for the produced film, if the average value of orientation angle is not 0, the average value of orientation angle can be controlled to be 0 by making the right and left edge holding distances (Xa and Xb) to be different from each other based on the average value.

Figure 2:
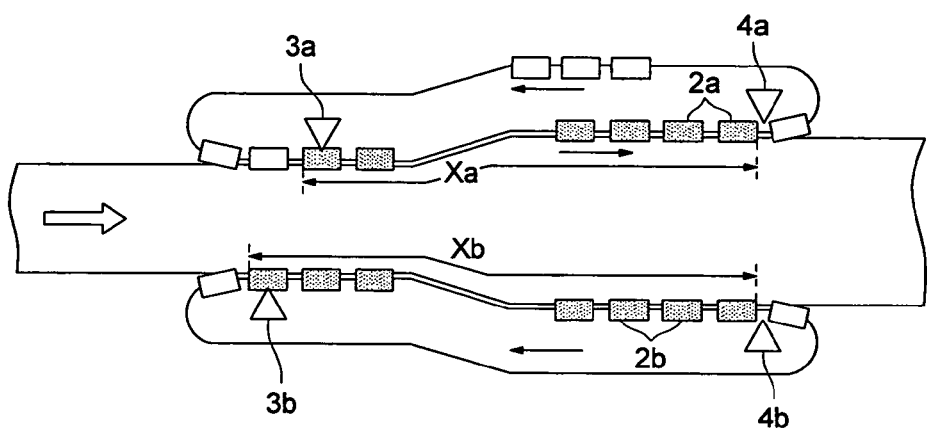
FIG. 2 is a schematic plan view showing the first embodiment of the present invention.

FIG. 2 shows a specific example of the device which makes the right and left film F holding distances differ by interdentally controlling the distance of the portion which holds the right and left edges of resinous film F in tenter stretching apparatus 10. FIG. 2 is a schematic view showing the first embodiment of the tenter stretching apparatus employed in the method of the present invention. As can be seen in FIG. 2, the right and left holding start positions of holding devices (clips) 3a and 3b of tenter stretching apparatus 10 are allowed to differ, namely, arranged positions of right and left clip closers 3a and 3b are allowed to differ, resulting in difference between right and left film F holding distances, whereby a force which twists resinous film F in tenter 10 is generated. As a result, it is possible to correct deviation of the orientation angle which is caused by any non-uniformity of conveying and drying facilities other than tenter 10, whereby it is possible to produce an optical film which exhibits the uniform orientation angle in the transverse direction (the TD direction) within almost all portions of film F.

Further, though tenter stretching apparatus 10 in FIG. 2 is schematically shown, a usual arrangement is as follows. Of numerous clips 2a and 2b which are successively arranged in a line in a pair of the right and left rotation driving devices (ring-shaped chains) 1a and 1b, composed of a looped chain, tracks of right and left chains 1a and 1b are arranged so that clips 2a and 2b of a moving section on the chain advancing side, which holds the right and left edges of film F and them, are gradually released in the transverse direction of film F, whereby stretching in the transverse direction of film F is performed (applied in the following drawings).

Figure 3:
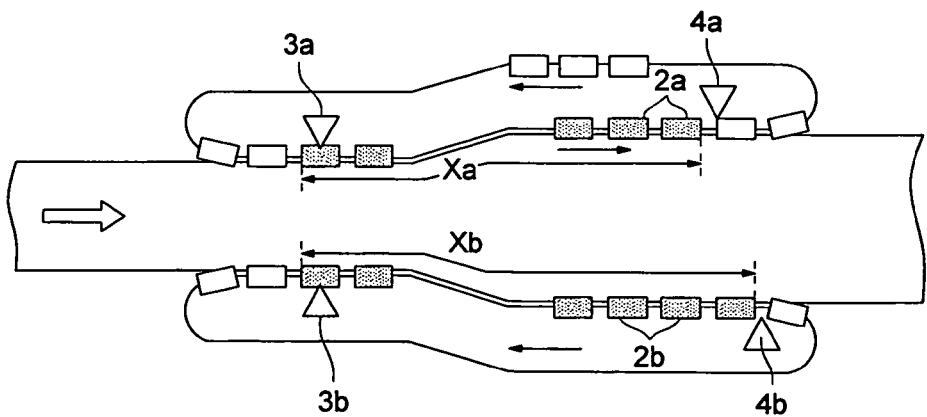
FIG. 3 is a schematic plan view showing the second embodiment of the present invention.

Further, FIG. 3 is a schematic view showing the second embodiment of tenter stretching apparatus 10 employed in the method of the present invention. As can be seen in FIG. 3, the right and left holding cessation positions of holding devices (clips) 2a and 2b of tenter stretching apparatus 10 are allowed to differ, namely, arranged positions of right and left clip openers 4a and 4b are allowed to differ, resulting in the difference between the right and left film F holding distances, whereby a force which twists resinous film F in tenter 10 is generated. As a result, it is possible to correct any deviation of the orientation angle which is caused by the non-uniformity of conveying and drying facilities other than tenter 10, whereby it is possible to produce an optical film which exhibits the uniform orientation angle in the transverse direction (the TD direction) over almost all portions of film F.

Further, in the production method of the optical film according to the present invention, the right and left holding distances are allowed to differ by independently changing the right and left distances of the looped moving track rail (not shown) of connected holding devices (clips) 2a and 2b which hold the right and left edges of continuous resinous film F which result in tension. For example, when the number of left clips 2a is the same as the number of right clips 2b and the left rail distance differs from the right rail distance, the distance between clips 2a and 2b slightly differs between the right and left edges. Even though the variation amount between clips 2a and 2b is very small, several hundred to several thousand clips 2a and 2b are employed, whereby the right and left film holding distances differ substantially. In such a manner, a force which twists the resinous film is generated in tenter 10, whereby it is possible to correct any deviation of the orientation angle caused by non-uniformity of conveying and drying facilities other than the tenter, and it is possible to produce an optical film which exhibits uniform orientation angle in the transverse direction (the TD direction) over almost all portions of film F.

Figure 4:
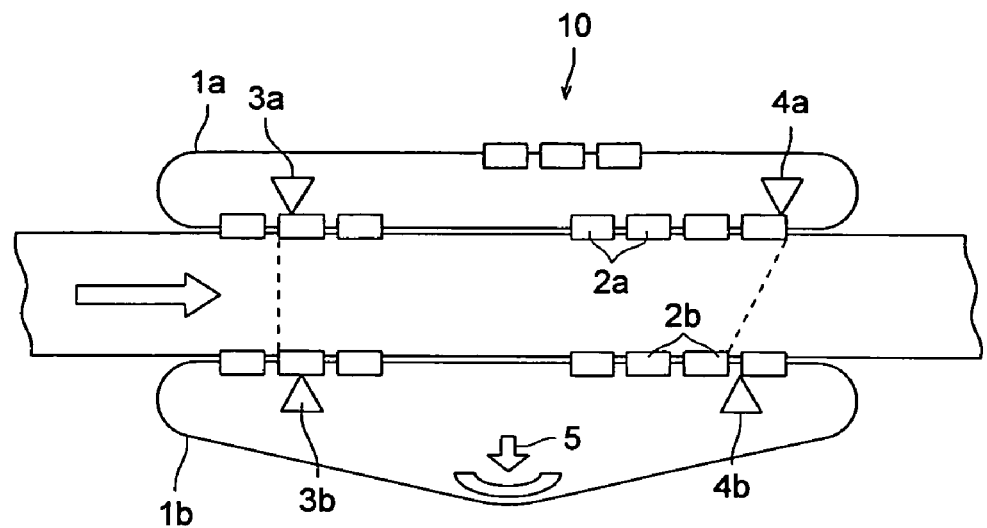
FIG. 4 is a schematic plan view showing the third embodiment of the present invention.

Further, in tenter apparatus 10, tension is applied to connected clip chains 1a and 1b and by changing the right and left tension, the film F holding distance varies. For example, FIG. 4 is a schematic view of the third embodiment of tenter stretching apparatus 10 employed in the method of the present invention. In FIG. 4, the right and left film F holding distances are allowed to differ in such a manner that tensioner 5 is arranged on the way of the linear turning side moving section of clip chain 1b on the right side and large tension is applied to clip chain 1b on the right side.

Figure 5:
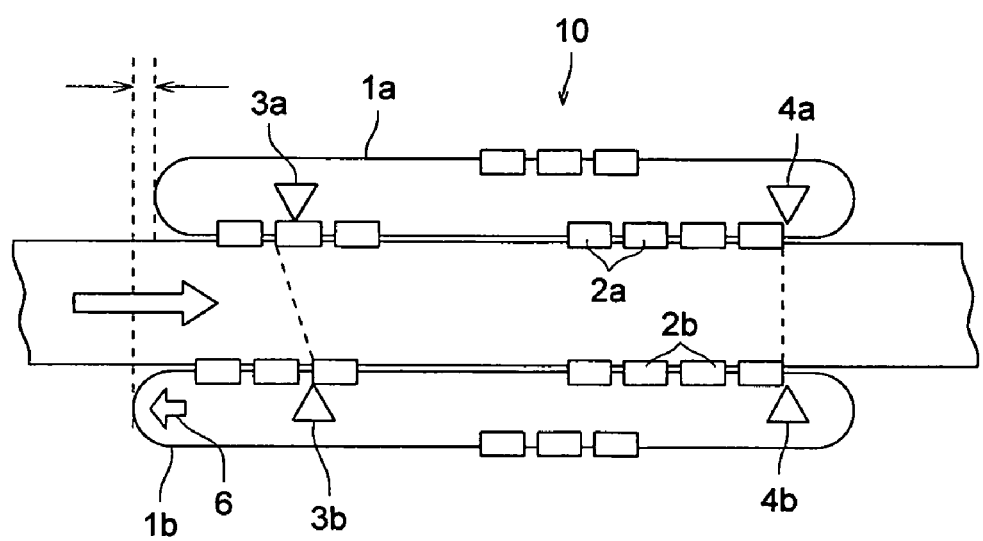
FIG. 5 is a schematic plan view showing a modified example of the third embodiment of the present invention.

Further, for example, FIG. 5 is a schematic view of the modified example of the third embodiment of tenter stretching apparatus 10 employed in the method of the present invention. In FIG. 5, tensioner 6 is arranged at one end of the looped turning section of clip chain 1b on the right side and large tension is applied to the looped turning section of clip chain 1b on the right side, whereby the right and left holding distances of film F differ.

Figure 6:
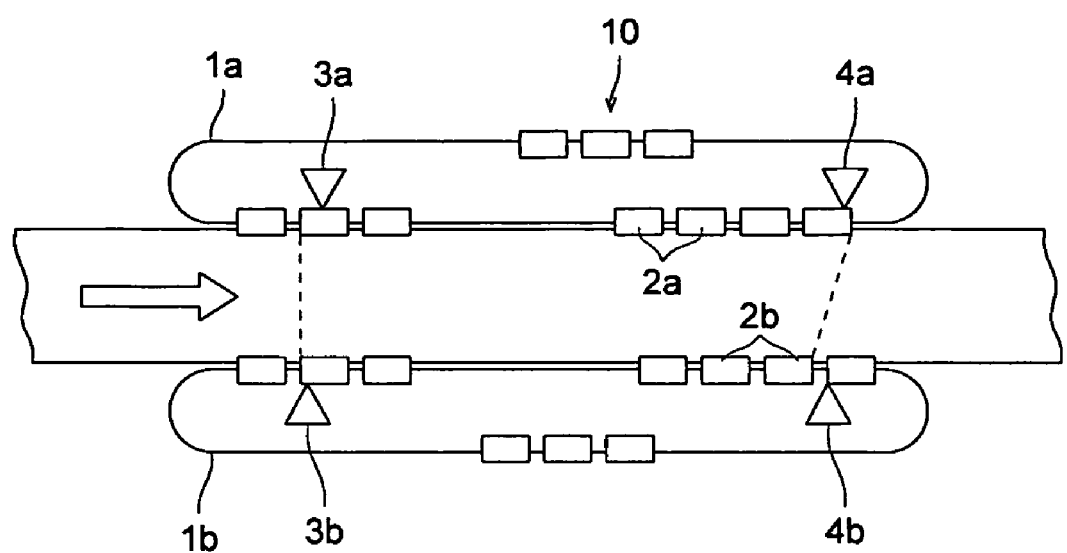
Figure 6:
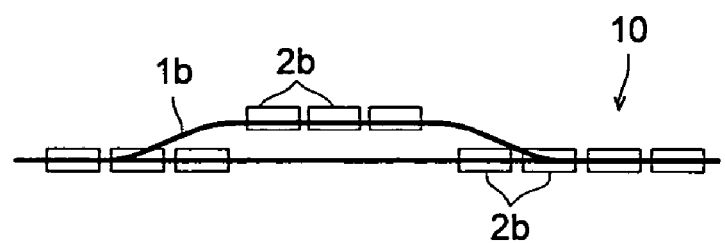

Further, the device to allow the right and left rail distances to differ include those shown in FIGS. 6a and 6b. FIGS. 6a and 6b each are schematic views showing the fourth embodiment of tenter stretching apparatus 10 employed in the method of the present invention. In FIGS. 6a and 6b, other than the change of clips 2a and 2b in a certain plane, it may allow the right and left holding distances of film F to differ by bending linear turning side moving section of clip chain 1b on the right side in the vertical direction.

Subsequently, in the production method of the optical film of the present invention, controlled stretching is achieved so that a slow axis is substantially perpendicular (at an average value within 90°±1.5°) or substantially parallel (at an average value within 0°±1.5°) to the film conveying direction by independently controlling the speed of right and left holding devices (clips) 2a and 2b of tenter stretching apparatus 10, whereby a force which twists resinous film F is generated not only by allowing the right and left resinous film F holding distances to differ but also by allowing the speed of right and left clips 2a and 2b to differ, and it is possible to correct any deviation of the orientation angle.

Figure 7:
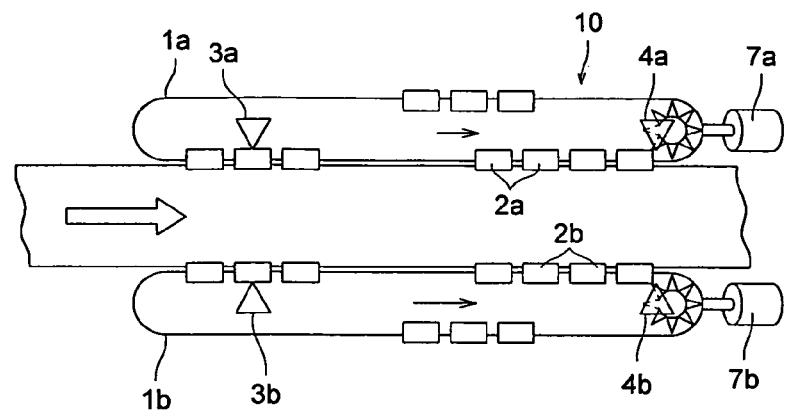
FIG. 7 is a schematic plan view showing the fifth embodiment of the present invention.

Herein, an example of a device to independently control right and left holding devices (clips) 2a and 2b of tenter stretching apparatus 10 include one shown in FIG. 7. FIG. 7 is a schematic view of the fifth embodiment of tenter stretching apparatus 10 employed in the method of the present invention. Employed as a device to independently control the speed of right and left holding devices (clips) 2a and 2b are independent right and left driving motors 7a and 7b. Conventionally, the right and left holding devices (clips) have been controlled employing a single motor so that the right and left speeds are the same.

As noted above, not only by allowing the right and left resinous film F holding distances to differ, but also by allowing the speed of clips 2a and 2b to differ, a force which twists resinous film F is generated, whereby it is possible to correct any deviation of the orientation angle. In addition, independent control of the speed is achieved employing separately controlled right and left motors 7a and 7b as shown in FIG. 7, or a pantagraph or spindle commonly employed as a biaxial stretching apparatus 10, or a linear motor.

Figure 8:
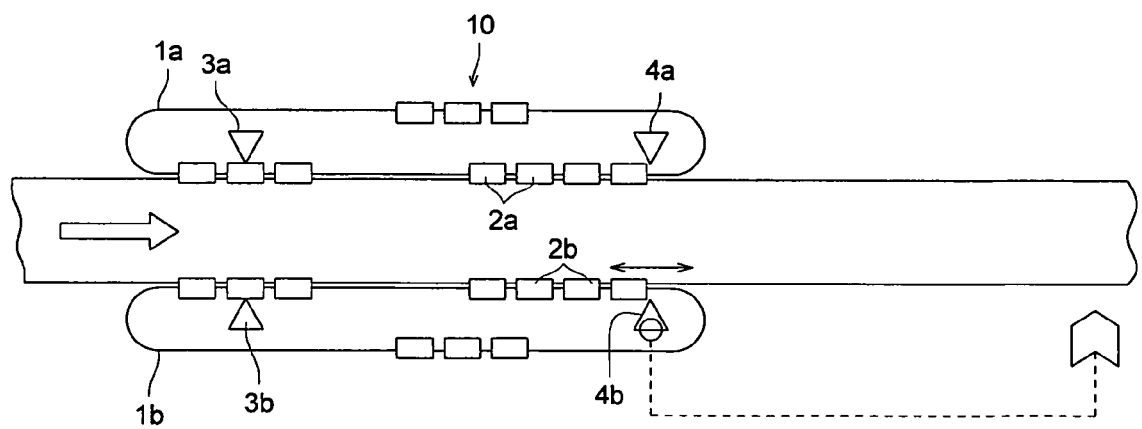
FIG. 8 is a schematic plan view showing the sixth embodiment of the present invention.

FIG. 8 is a schematic view showing the sixth embodiment of tenter stretching apparatus 10 employed in the method of the present invention. As shown in FIG. 8, the orientation angle of resinous film 10 prior to winding is determined on-line, employing an orientation angle measurement instrument 8. Based on those results, the right and left film F holding distances are independently controlled employing the right and left holding devices (clips) 2a and 2b of stretching apparatus 10, or the speeds of the right and left holding clips 2a and 2b are independently controlled employing driving motors 7a and 7b (refer to FIG. 7). Even though resinous films F are produced under fixed conditions, the resulting orientation angle generally fluctuates due to slight variation of materials and facilities. Therefore, the orientation angle of products is determined prior to winding on line, employing orientation angle measurement instrument 8 and the results are subjected to feed-back, whereby by changing the holding distance or speed of film F, it is possible to produce a resinous film which is uniform in the longitudinal direction.

Figure 9:
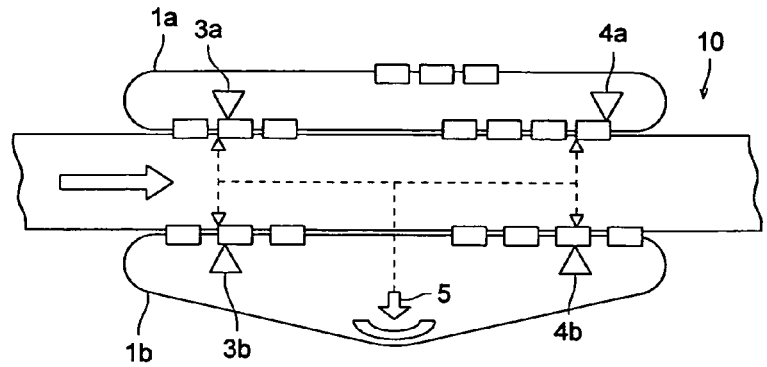
FIG. 9 is a schematic plan view showing the seventh embodiment of the present invention.

Further, FIG. 9 is a schematic view showing the seventh embodiment of tenter stretching apparatus 10 employed in the method of the present invention. In FIG. 9, positions of right and left holding devices (clips) 2a and 2b at the start of holding and the cessation of holding in tenter stretching apparatus 10 are detected, and the phase difference between holding devices (clips) 2a and 2b is determined. Based on the results, the right and left film F holding distances by right and left holding devices (clips) 2a and 2b of tenter stretching apparatus 10 are independently changed in such a manner that as shown in the above drawing, tensioner 5 is arranged on the way of the linear return side moving section of clip chain 1b on the right side and large tension is applied to clip chain 1b on the right side, or for example, as shown in FIG. 7, the speed of right and left holding devices (clips) 2a and 2b is controlled employing driving motors 7a and 7b which separately control the speed of right and left holding devices (clips) 2a and 2b of stretching apparatus 10.

Herein, a device to detect the positions of employed right and left holding clips includes a contact system, a photoelectric system, a laser system, an ultrasonic system, and an eddy current system displacement gauge, as well as image analysis methods employing a switch sensor or a CCD camera. Of these, when maintenance requirements are considered, non-contact sensors are preferred. It is preferable that sensors are arranged at the four positions of right and left holding start and holding cessation. However, the sensors may also be arranged at additional positions. By being driven by right and left sprockets which synchronously rotate near the holding cessation position, when it is clear that the positions of right and left holding clips are synchronized, it is possible to detect the right and left holding distances employing only sensors at two positions of the right and left holding start.

In such a manner, by detecting the positions of right and left clips 2a and 2b at the entrance and exit of tenter stretching apparatus 10, the right and left holding distances of film F are assuredly determined, whereby it is possible to quickly respond to the variation of the orientation angle due to abrasion of bearings during operation. Based on such data, by controlling so that desired difference between the right and left film F holding distances is achieved, a force which twists resinous film F is generated, whereby it is possible to correct any deviation of orientation angle.

The retardation film according to the present invention is composed of an optical film produced by the above method according to the present invention, whereby the orientation angle in the transverse direction (the TD direction) is uniform over almost the entire portion of film F and excellent retardation compensating properties and a viewing angle enlarging function result.

Further, the optical film according to the present invention is produced employing the above method according to the present invention. The resinous film is composed of cellulose ester film, whereby the orientation angle in the transverse direction (the TD direction) is uniform over almost the entire portion of film F and excellent retardation compensating properties and a viewing angle enlarging function result.

Further, the optical film according to the present invention is produced employing the method using any one of the above stretching methods during in-line stretching in the solution casting film forming method, whereby the orientation angle in the transverse direction (the TD direction) is uniform over almost the entire portion of film F and excellent retardation compensating properties and a viewing angle enlarging function result.

The optical film according to the present invention is stretched so that the residual solvent amount in resinous film F reaches 5-50 percent by weight. When the residual solvent amount in the resinous film is excessively small during stretching employing the solution casting method, the resulting film becomes relatively hard to degrade controllability due to necessity of relatively large control. On the other, when the residual solvent amount in the resinous film is excessively large, the resulting film becomes relatively soft to result in difficult control due to necessity of delicate control. By controlling the above residual solvent amount within the above range, it is possible to obtain an optical film which results in the uniform orientation angle in the transverse direction (the TD direction) over almost all portions of the film and exhibits excellent retardation compensating properties as well as a viewing angle enlarging function.

Further, the optical film according to the present invention is produced by employing any of the above stretching methods during performing in-line stretching of the resinous film employing the solution casting film forming method, whereby the resulting orientation angle in the transverse direction (the TD direction) is uniform over almost all portions of the film and excellent retardation compensating properties and a viewing angle enlarging function result.

It is possible to produce an elliptical polarizing plate by allowing the optical film produced employing the method of the present invention to adhere to at least one side of a polarizing film.

The polarizing film is produced in such a manner that a conventionally employed film such as a polyvinyl alcohol film, capable of being stretched and oriented, is treated with diachronic dyes such as iodine and stretched vertically. Since the polarizing film itself exhibits neither sufficient strength nor durability, a polarizing plate is generally produced by allowing a non-anisotropic triacetate film to adhere to both sides of the polarizing film.

The polarizing plate may be prepared by allowing an optical film of the present invention to adhere to the above polarizing film or by allowing an optical film of the present invention which also functions as a protective film to directly adhere to the polarizing film.

Further, it is possible to obtain a long polarizing plate by allowing the optical film of the present invention to adhere to a long polarizing film which has been subjected to stretching in the longitudinal direction and a diachroic dye treatment. The polarizing plate may be of an adhesion type (it is possible to easily adhere to a liquid cell by peeling a peeling sheet) which is prepared by laminating a peeling sheet on one side or both sides via a pressure-sensitive adhesive layer (for example, a pressure sensitive acryl based adhesive layer).

It is possible to use the polarizing plate of the present invention, prepared as above, in various display devices. Specifically preferred is a liquid crystal device employing the liquid crystal cell of a VA mode in which liquid crystalline molecules are substantially vertically oriented under no application of electric voltage or a TN mode in which liquid crystalline molecules are substantially horizontally twist-oriented under application of no electric voltage.

EXAMPLES

The present invention will now be described with reference to examples, however the present invention is not limited thereto.

Example 1

Initially, a 65 μm thick polycarbonate resinous film (the trade name of R FILM, produced by Kaneka Co., Ltd.) was unwound. As shown in FIG. 2, in tenter stretching apparatus 10, arranged was a pair of right and left rotation driving devices 1a and 1b composed of a looped chain entrained on the front and rear sprockets on the right and left sides of the housing, and these rotation driving devices 1a and 1b are linearly fitted with many clips 2a and 2b. The above polycarbonate resinous film was stretched in the transverse direction (the TD direction) employing tenter stretching apparatus 10 which was heated to 150° C. The above polycarbonate resinous film may be produced employing either the solution casting film forming method or the melt casting film forming method.

During the above operation, the speed of right and left clips 2a and 2b were controlled to be the same, but the holding start positions of clips 2a and 2b were allowed to differ. Namely, the positions of clip closers 3a and 3b were allowed to differ by 5 mm between the left side and the right side.

The orientation angle of the polycarbonate resinous film, prepared as above, was determined at 9 points in the transverse direction, employing Oji Keisokuki KOBRA-WIS/RT. As a result, it was possible to produce an optical film in which orientation angle θ of the polycarbonate resinous film F was in the range of −0.5° to +0.6°; the slow axis was substantially at right angles to the film conveying direction, namely in the range of 0°±1.5°; and the orientation angle was uniform in the transverse direction (the TD direction).

Example 2

A polycarbonate resinous film was produced in the same manner as above Example 1. However, in Example 2, as shown in FIG. 3, the holding cessation positions of right and left holding devices (clips) 2a and 2b were allowed to differ, namely the arranged positions of right and left clip openers 4a and 4b were allowed to differ by 5 mm, whereby the right and left film F holding distances differed.

The orientation angle of polycarbonate resinous film F, prepared as above, was determined in the same manner as in above Example 1. The results showed that orientation angle θ of polycarbonate resinous film F was at the range of −0.4° to +0.7°, and the slow axis of polycarbonate resinous film F was substantially at right angles to the conveying direction of film F, namely, the average value was within 90°±1.5°.

Example 3

Polycarbonate resinous film F was produced in the same manner as above Example 1. However, in Example 3, by allowing tension applied to right and left clip chain 1a and 1b of tenter apparatus 10 to differ, film F holding distances were changed. As shown in FIG. 4, tensioner 5 was arranged on the way of linear turning side moving section of clip chain 1b on the right side, and during stretching in tenter stretching apparatus 10, relatively large tension was applied to clip chain 1b on the rift side employing tensioner 5, whereby the right and left film F holding distances were made to differ by allowing the distances of right and left clip chain 1a and 1b to differ by 5 mm.

The orientation angle of polycarbonate resinous film F, prepared as above, was determined in the same manner as in above Example 1. The results showed that orientation angle θ of polycarbonate resinous film F was in the range of −0.40 to +0.50, and the slow axis of polycarbonate resinous film F was substantially at right angles to the conveying direction of film F, namely, the average value was within 90°±1.5°.

Example 4

Polycarbonate resinous film F was produced in the same manner as above Example 1. However, in Example 4, as shown in FIG. 7, independently right and left driving motors 7a and 7b were employed as a device to independently control the speed of right and left holding devices 7a and 7b of tenter stretching apparatus 10, and the speed of right and left clips 2a and 2b was independently controlled by allowing the driving speed of right and left holding devices (clips) 2a and 2b of tenter stretching apparatus 10 to differ by 0.3 percent, namely by allowing the right and left driving speed to differ by 0.3 percent.

The orientation angle of polycarbonate resinous film F, prepared as above, was determined in the same manner as in above Example 1. The results showed that orientation angle θ of polycarbonate resinous film F was in the range of −0.50 to +0.5°, and the slow axis of polycarbonate resinous film F was substantially at right angles to the conveying direction of film F, namely, the average value was within 90°±1.5°.

Comparative Example 1

A polycarbonate resinous film was produced in the same manner as above Example 1. However, in Comparative Example 1, during film stretching in the tenter stretching apparatus, the film holding distances of the right and left holding devices were set to be the same and the speed of the right and left clips were also set to be the same.

The orientating angle of the polycarbonate resinous film produced as above was determined in the same manner as in above Example 1. The results showed that orientation angle θ of the polycarbonate resinous film was in the range of −1.7° to 0.5°, and the average angle value of the slow axis of polycarbonate resinous film to the conveying direction of the film exceeded 90°±1.5°. As shown above, the polycarbonate resinous film of Comparative Example 1 was commercially unviable as a retardation film or as a viewing angle enlarging film since the desired uniform distribution of film orientation angle was not achieved.

Example 5

Polycarbonate film F was produced in the same manner as above Example 1. However, as shown in FIG. 8, measurement instrument 8, which determined orientation angle and retardation, was arranged in the line after stretching but prior to winding. Measurement instrument 8 scanned the surface of film F during conveyance in the TD direction, which resulted in the orientation angle and retardation values of film F in real time. Herein, employed as measurement instrument 8 was Oji Scientific Instruments KOBRA-WIS/RT. When measurement was performed employing the above instrument, the retardation and orientation angle were simultaneously determined and outputted. A device which controlled the position of clip opener 3b of tenter stretching apparatus 10, based on the signals of the resulting orientation angle and retardation value, was arranged at the same time.

In the above manner, 100 rolls of polycarbonate film F were produced over one week. The standard deviation of the orientation angle of all the rolls was 0.4° and the production ratio of commercially unviable products which were beyond 90°±1° was 1 percent.

Comparative Example 2

Comparative Example 2 was performed in the same manner as above Example 5. However, 100 rolls of polycarbonate film F were produced over one week without a device to detect the retardation of the film in the production line. The standard deviation of the orientation angle of all the rolls was 0.8° and the production ratio of commercially unviable products which were beyond 90°±1° was 23 percent.

Example 6

Polycarbonate film F was produced in the same manner as above Example 1. However, as shown in FIG. 9, the device which determined the positions of clips 2a and 2b was arranged at right and left positions, totaling four, near the holding start and holding cessation of tenter stretching apparatus 10. Right and left film F holding distances and deviation of the right and left positions of clips 2a and 2b were continuously monitored. Based on the detection results, fine adjustment of the distances of right and left chain 1a and 1b was accomplished by operating tensioner 5, whereby 200 film rolls were produced over three months. The results showed that the standard deviation of the orientation angle of all 200 rolls was 0.5° and the production ratio of commercially unviable products which were beyond 90°±1° was 5 percent.

Comparative Example 3

Comparative Example 3 was performed in the same manner as above Example 6. However, 200 film rolls were produced over three months without a device to monitor clip positions. The standard deviation of the orientation angle of all rolls was 1.00 and the production ratio of commercially unviable products which were beyond 90°±1° was 38 percent.

Example 7

Based on the method of the present invention, an optical film composed of a cellulose triacetate propionate resin was produced employing the solution casting film forming method.

(Preparation of Dope)

Initially, a cellulose acetate propionate dope was prepared as described below.

| | |
|---|---|
| Cellulose acetate propionate (at a degree of substitution of an acetyl group of 1.95, a degree of substitution of a propionyl group of 0.7, and at a glass transition temperature of approximately 185° C.) | 100 weight parts |
| Triphenyl phosphate | 10 weight parts |
| Ethylphthalyl ethyl glycolate | 2 weight parts |
| TINUVIN 326 (produced by Ciba Specialty Chemicals Co.) | 1 weight part |
| AEROSIL 200V (produced by Nippon Aerosil Co., Ltd.) | 0.1 weight part |
| Methylene chloride | 300 weight parts |
| Ethanol | 40 weight parts |

The above materials were successively charged into a sealed vessel and the temperature in the vessel was heated from 20° C. to 80° C. Thereafter, while the temperature was maintained at 80° C., stirring was performed for three hours, whereby cellulose acetate propionate was completely dissolved. Then, stirring was terminated and the temperature of the resulting solution was lowered to 43° C. The resulting dope was filtered employing a filter (AZUMI ROSHI No. 244, produced by Azumi Filter Paper Co., Ltd.), whereby a dope was obtained.

The dope, as prepared as above, was cast, via a casting die heated to 30° C., onto a support composed of a looped stainless steel belt maintained at 30° C. to form a web (a dope film), which was dried on the support so that the residual solvent amount in the web reached 80 percent by weight. Thereafter, the web was peeled from the support employing a peeling roller.

Subsequently, the resulting web was further dried in a staggered roller conveying drying process and subsequently led to stretching apparatus 10, composed of a tenter wherein while being clipped at both edges, the web was substantially stretched in the transverse direction under the condition of the presence of residual solvents and dried by blown drying air.

Further, the web (film F) was dried in a staggered roller conveying drying process and wound by a winder, whereby eventually, a 60 μm thick cellulose acetate propionate film (F) was prepared.

In above Example 7, conveying speed of the right and left clips was fixed and when the residual solvent amount of film F during stretching reached 14 percent, right and left film F holding distances were allowed to differ by 5 mm and cellulose triacetate propionate film F was stretched.

The orientation angle of cellulose triacetate propionate film F, prepared as above, was determined in the same manner as in above Example 1. As a result, it was possible to produce an optical film in which orientation angle θ of cellulose acetate propionate film F was in the range of −0.30 to +0.50; the slow axis of cellulose acetate propionate film F was substantially at right angles to the film conveying direction, namely in the range of 90°±1.5° on average; and the orientation angle was uniform in the transverse direction (the TD direction).

Comparative Examples 4-6

Subsequently, for comparison, a cellulose acetate propionate film was produced in the same manner as above Example 7. However, in Comparative Example 4, the right and left clip conveying speeds were fixed, and when the residual solvent amount of the film during stretching was 4 percent, which was beyond the range of the present invention, stretching was performed by equalizing the right and left film holding distances.

The orientation angle of the cellulose acetate propionate film, prepared as above, was determined in the same manner as in above Example 1. The results showed that orientation angle θ of the cellulose acetate propionate film was in the range of −1.7° to +1.2°.

Further, in Comparative Example 5, the conveying speeds of the right and left clips were fixed, and when the residual solvent amount of the film during stretching was 4 percent which was beyond the range of the present invention, stretching was performed by allowing right and left film holding distances to differ by 5 mm.

The orientation angle of the cellulose acetate propionate film F, prepared as above, was determined in the same manner as in above Example 1. The results showed that orientation angle θ of the cellulose acetate propionate film was in the range of −1.7° to +1.0°.

In Comparative Example 6, the conveying speeds of the right and left clips were fixed, and when the residual solvent amount of film F during stretching was 54 percent which was beyond the range of the present invention, stretching was performed by allowing the right and left film F holding distances to differ by 5 mm.

The orientation angle of cellulose acetate propionate film F, prepared as above, was determined in the same manner as in above Example 1. The results showed that orientation angle θ of the cellulose acetate propionate film was in the range of −0.2° to +1.8°.

As noted above, in Comparative Examples 4-6, the average angle value of the slow axis of the cellulose triacetate propionate film to the film conveying direction exceeded 90°±1.5°. The cellulose acetate propionate films prepared in Comparative Examples 4-6 were commercially unviable as a retardation film or a viewing angle enlarging film since the desired uniform distribution of the film orientation angle was not obtained.

Example 8

An optical film of cycloolefin resin prepared by a melt casting film making method of the present invention is described below.

Pellets of a norbornene resin (Tps) (TOPAS # 6015, Tg=155° C., produced by Chicona Co. Ltd.) were dried for 3 hours at 100° C. in a hot air drying apparatus. The pellets were set in a 50 mm single screw extruder provided with a stainless fiber sintered filter (filtering precision of 20 μm) and extruded with a T die at 250° C. The norbornene polymer film extruded was solidified on a cooling drum having a temperature of 140° C., then peeled from the cooling drum. The peeled film was introduced in a tenter 10, and it was subjected to a stretching process with blowing a hot air of 130° C. and was winded in a roll.

During the stretching process, the running speed of right and left clips 2a and 2b was controlled to be same. However, each position of clip closers 3a and 3b was shifted by 3 mm so as to differ the edge holding distance of each film side Xa and kb. The obtained film has an orientation angle in the range of −0.2 to +0.3°.

Example 9

A film of a norbornene resin was produced in the same manner as in the above-described Example 8 except that the peeled film from the drum was at first rolled without subjected to a stretching process. Thus rolled film was then run out again so as to stretch in a tenter with blowing a hot air of 130° C. and was winded in a roll just as in Example 8.

During the stretching process, the running speed of right and left clips 2a and 2b was controlled to be same. However, each position of clip closers 3a and 3b was shifted by 3 mm so as to differ the edge holding distance of each film side Xa and Xb. The obtained film has an orientation angle in the range of −0.7 to +0.9°. The value was within 90±1.5°, but it was inferior to the film produced in Example 8.

A film of polystyrene was produced in the same manner as in Example and the orientation angle of the obtained film was within 90±1.5°.

What is claimed is:

1. A method of producing an optical film comprising the step of:
    stretching a continuous resinous film by apply tension to a transverse direction of the resinous film while conveying the resinous film,
    wherein the stretching is carried out with a stretching apparatus comprising right and left edge holding devices which hold right and left edges of the resinous film and move on a track; and
    the right and left edge holding devices of the stretching apparatus each independently controls right and left edge holding distances of the resinous film so that a slow axis of the resinous film is substantially perpendicular or substantially parallel to a film conveying direction,
    provided that the edge holding distance is defined as a distance between an initiation position and a cessation position of holding of the edge of the resinous film and
    wherein the right and left edge holding devices of the stretching apparatus each independently controls the initiation position of the right and left edges of the resinous film without changing the track so as to control the right and left edge holding distances of the resinous film.

2. The method of producing an optical film of claim 1, further comprising the steps of:
    determining an orientation angle of the resinous film after the stretching; and
    winding the resinous film after the determination of the orientation angle,
    wherein the right and left edge holding distances are independently controlled based on the orientation angle determined.

3. The method of producing an optical film of claim 1, wherein each position of the right and left edge holding devices at the initiation position of holding and the cessation position of holding is detected on-line, a phase difference between the right and the left positions of the edge holding devices is determined, and based on the phase difference determined, the right and left edge holding distances are independently controlled via the right and left edge holding devices of the stretching apparatus.

4. The method of producing an optical film of claim 1, wherein the initiation position is controlled by changing a position of a clip closer for initiating the holding of the edge of the film.

5. A method of producing an optical film comprising the step of:
    stretching a continuous resinous film by apply tension to a transverse direction of the resinous film while conveying the resinous film,
    wherein the stretching is carried out with a stretching apparatus comprising right and left edge holding devices which hold right and left edges of the resinous film and move on a track; and
    the right and left edge holding devices of the stretching apparatus each independently controls right and left edge holding distances of the resinous film so that a slow axis of the resinous film is substantially perpendicular or substantially parallel to a film conveying direction,
    provided that the edge holding distance is defined as a distance between an initiation position and a cessation position of holding of the edge of the resinous film
    wherein the right and left edge holding devices of the stretching apparatus each independently controls the cessation position of the right and left edges of the resinous film without changing the track so as to control the right and left edge holding distances of the resinous film.

6. The method of producing an optical film of claim 5, further comprising the steps of:
    determining an orientation angle of the resinous film after the stretching; and
    winding the resinous film after the determination of the orientation angle,
    wherein the right and left edge holding distances are independently controlled based on the orientation angle determined.

7. The method of producing an optical film of claim 5, wherein each position of the right and left edge holding devices at the initiation position of holding and the cessation position of holding is detected on-line, a phase difference between the right and the left positions of the edge holding devices is determined, and based on the phase difference determined, the right and left edge holding distances are independently controlled via the right and left edge holding devices of the stretching apparatus.

8. The method of producing an optical film of claim 5, wherein the cessation position is controlled by changing a position of a clip opener for terminating the holding of the edge of the film.

* * * * *